United States Patent
Cao et al.

(10) Patent No.: US 11,044,748 B2
(45) Date of Patent: Jun. 22, 2021

(54) METHODS AND APPARATUS FOR SIDELINK COMMUNICATIONS AND RESOURCE ALLOCATION

(71) Applicants: Yu Cao, Kanata (CA); Amine Maaref, Ottawa (CA); Jianglei Ma, Ottawa (CA)

(72) Inventors: Yu Cao, Kanata (CA); Amine Maaref, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/392,827

(22) Filed: Apr. 24, 2019

(65) Prior Publication Data

US 2019/0342910 A1  Nov. 7, 2019

Related U.S. Application Data

(60) Provisional application No. 62/665,286, filed on May 1, 2018.

(51) Int. Cl.
*H04W 72/14* (2009.01)
*H04W 4/40* (2018.01)
*H04W 72/12* (2009.01)

(52) U.S. Cl.
CPC ............ *H04W 72/14* (2013.01); *H04W 4/40* (2018.02); *H04W 72/1289* (2013.01)

(58) Field of Classification Search
CPC ... H04W 72/14; H04W 72/1289; H04W 4/40; H04W 72/042; H04W 72/02; H04W 92/18; H04L 5/001; H04L 5/0091; H04L 5/0048; H04L 5/0053

USPC .................................................. 370/330, 329
See application file for complete search history.

(56) References Cited

U.S. PATENT DOCUMENTS

| | | | |
|---|---|---|---|
| 2016/0073408 A1* | 3/2016 | Sartori | H04W 72/0453 370/329 |
| 2017/0188391 A1 | 6/2017 | Rajagopal et al. | |
| 2017/0289733 A1 | 10/2017 | Rajagopal et al. | |
| 2018/0014345 A1 | 1/2018 | Sartori et al. | |
| 2018/0115960 A1* | 4/2018 | Sorrentino | H04W 72/042 |

(Continued)

FOREIGN PATENT DOCUMENTS

| | | |
|---|---|---|
| CN | 106162900 A | 11/2016 |
| KR | 20180036476 A | 4/2018 |
| WO | 2018004323 A1 | 1/2018 |

OTHER PUBLICATIONS

Huawei, HiSilicon, Discussion on V2V resource pool configuration. 3GPP TSG-RAN WG4 Meeting #82 Athens, Greece, Feb. 13-17, 2017, R4-1701116, 3 pages.

*Primary Examiner* — Kwang B Yao
*Assistant Examiner* — Syed M Bokhari

(57) ABSTRACT

A user equipment (UE) receives a message that indicates a sidelink (SL) communication resource configuration to be used by the UE for communicating SL control information and SL data between the UE and another UE. The UE transmits SL control information according to the SL communication resource configuration, and transmits SL data according to the SL communication resource configuration. The SL control information and the SL data are transmitted by the UE without the UE receiving, in a downlink control information (DCI), a grant of communication resources.

18 Claims, 22 Drawing Sheets

(56) References Cited

U.S. PATENT DOCUMENTS

| | | | |
|---|---|---|---|
| 2018/0206260 A1* | 7/2018 | Khoryaev | H04W 72/1289 |
| 2018/0242190 A1* | 8/2018 | Khoryaev | H04W 28/0284 |
| 2019/0053193 A1* | 2/2019 | Park | H04W 72/02 |
| 2019/0174530 A1* | 6/2019 | Kim | H04L 1/0003 |
| 2019/0254059 A1* | 8/2019 | Gulati | H04W 72/14 |
| 2019/0306912 A1* | 10/2019 | Cheng | H04W 76/27 |
| 2019/0327732 A1 | 10/2019 | Yoon | |
| 2020/0068532 A1* | 2/2020 | Bengtsson | H04W 72/042 |
| 2020/0092692 A1* | 3/2020 | Wang | H04W 4/40 |

* cited by examiner

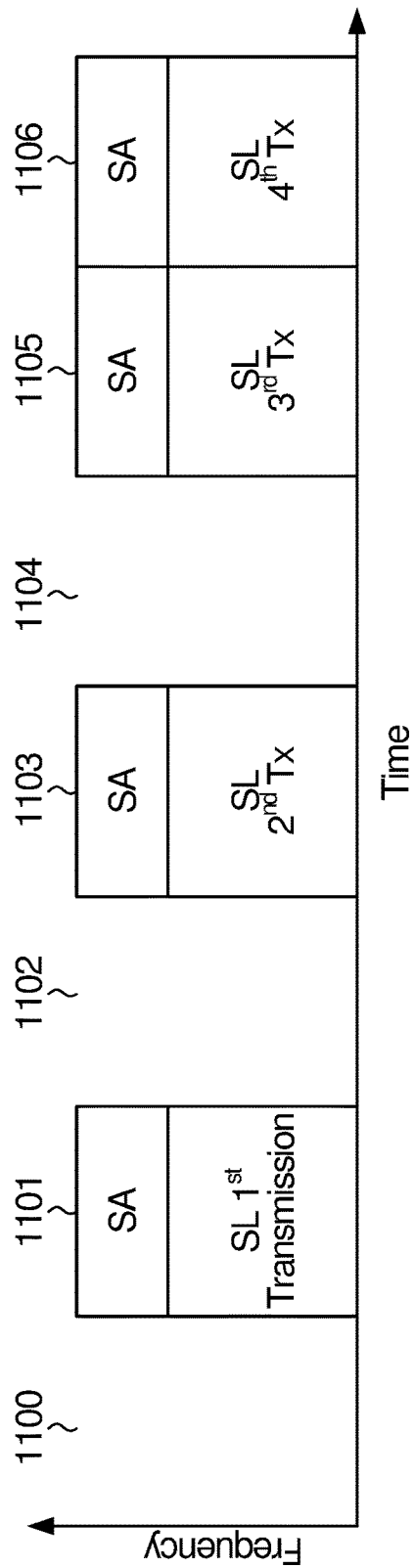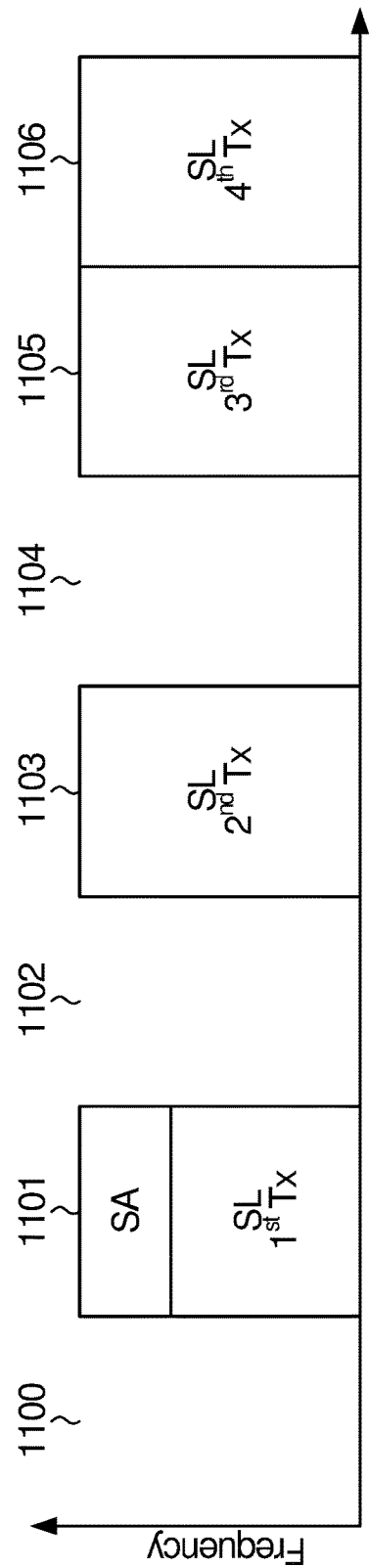

METHODS AND APPARATUS FOR SIDELINK COMMUNICATIONS AND RESOURCE ALLOCATION

CROSS-REFERENCE TO RELATED APPLICATION

The present application claims the benefit of U.S. Provisional Application No. 62/665,286, entitled "METHODS AND APPARATUS FOR SIDELINK COMMUNICATIONS AND RESOURCE ALLOCATION", filed on May 1, 2018, the entire contents of which are incorporated herein by reference.

FIELD

The application relates generally to wireless sidelink (SL) communications, and in particular embodiments, to resource allocation thereof.

BACKGROUND

One possible application of sidelink (SL) communications is vehicle to everything/anything (V2X) communication, for example, which is an increasingly important new category of communication that may become widespread in next generation wireless communication networks, such as 5G New Radio (NR) systems. V2X refers to a category of communication scenarios, including communication from a vehicle to another vehicle (V2V), vehicle to infrastructure (V2I), and vehicle to pedestrian (V2P), for example. In general, a vehicle communicating in a network is considered user equipment (UE).

The communication in V2X systems may be performed using links between the network and the UE, such as an uplink (UL) and a downlink (DL). The UL is a wireless communication from a UE to a base station (BS), and the DL is a wireless communication from a BS to a UE. In V2V communication using the UL and DL, data is transmitted from a transmitting UE to a BS, and then transmitted from the BS to a receiving UE.

Alternatively, some V2X communication scenarios may be D2D communications, in which case the transmission in V2X systems may be performed between the transmitting UE and receiving UE using a sidelink. The SL allows data to be transmitted directly from the transmitting UE to the receiving UE, without forwarding the data via the BS.

Communication resources are required for UL, DL and SL communications. For example, a UE could wirelessly transmit data to or receive data from another UE using a particular frequency and during a particular time slot. The combination of frequency and time slot define a communication resource in this example.

Challenges in V2X communications, and more generally SL communications, include efficient communication resource allocation and usage by UEs.

Furthermore, the SL also enables UE cooperation, which may be used to enhance the reliability, throughput, and capacity of communications. For example, data from a BS intended for a target UE (TUE) may be first transmitted to a cooperating UE (CUE), and then forwarded to the TUE. Similarly, data from the TUE intended for the BS may be forwarded via the CUE.

In general, the SL and UE cooperation may enhance the reliability, throughput, and capacity of any wireless communications. However, successful UE cooperation requires proper management of the SL between CUEs and TUEs in order to reduce interference and improve UE cooperation benefits.

SUMMARY

The present disclosure relates to a new mode of SL communication, which may be particularly suitable for V2X scenarios, but could be used in other applications. In particular, the new mode of SL communication may enable SL transmissions that do not necessitate a corresponding dynamic scheduling of physical communication resources. In other words, the new mode of SL communication may enable UEs to perform communications in an autonomous manner, without necessitating dynamic control from a base station, yet also without the common drawbacks associated with conventional autonomous SL communications.

A method performed by a UE according to one aspect of the present disclosure involves receiving, by the UE, a message indicating an SL communication resource configuration. The SL communication resource configuration is to be used by the UE for communicating SL control information and SL data between the UE and another UE. The method also involves transmitting, by the UE, SL control information according to the SL communication resource configuration, and also transmitting, by the UE, SL data according to the SL communication resource configuration. The SL control information and the SL data are transmitted by the UE without the UE receiving, in a downlink control information (DCI), a grant of communication resources.

A UE according to another aspect of the present disclosure includes a processor and a non-transitory computer readable storage medium storing programming for execution by the processor. The programming includes instructions to receive, by the UE, a message indicating an SL communication resource configuration to be used by the UE for communicating SL control information and SL data between the UE and another UE. The programming also includes instructions to transmit, by the UE, SL control information according to the SL communication resource configuration, and to also transmit, by the UE, SL data according to the SL communication resource configuration. The SL control information and the SL data are transmitted by the UE without the UE receiving, in a DCI, a grant of communication resources.

A method performed by a base station is also disclosed, and involves transmitting, by the base station, a message to a first UE. The message indicates an SL communication resource configuration to be used by the first UE for communicating SL control information and SL data between the UE and a second UE. The SL control information and the SL data are transmitted by the first UE without the base station transmitting, in a DCI, a grant of communication resources to the first UE.

According to a further aspect of the present disclosure, a base station includes a processor and a non-transitory computer readable storage medium storing programming for execution by the processor. The programming including instructions to transmit a message to a first UE, and the message indicates an SL communication resource configuration to be used by the first UE for communicating SL control information and SL data between the UE and a second UE. The SL control information and the SL data are transmitted by the first UE without the base station transmitting, in a DCI, a grant of communication resources to the first UE.

Another aspect of the present disclosure relates to a method performed by a user equipment (UE), the method comprising: receiving, by the UE, a message indicating a sidelink (SL) communication resource configuration to be used by the UE for SL control information and SL data communications between the UE and another UE; transmitting, by the UE, SL control information according to the SL communication resource configuration; and transmitting, by the UE, an SL data communication according to the SL communication resource configuration, wherein the SL control information and the SL data communication are transmitted by the UE without the UE receiving, in a downlink control information (DCI), a grant of communication resources.

The following features may be provided in embodiments, alone or in any of various combinations:

transmitting the SL control information comprises transmitting, by the UE, a scheduling assignment (SA) to the other UE using a communication resource defined in the SL communication resource configuration, the SA indicating communication resources used for transmitting the SL data communication;

the SL communication resource configuration comprises a transmission pattern that defines a pattern for transmitting the SL data communication;

the transmission pattern defines an initial transmission of a data block and a repetition of the data block;

the transmission pattern further defines time resources used for the initial transmission of the data block and the repetition of the data block;

the SL communication resource configuration further comprises a starting time of the transmission pattern;

the transmission pattern further defines a time gap from the initial transmission of the data block to the repetition of the data block;

transmitting the SL control information comprises transmitting one instance of the SL control information for both the initial transmission of the data block and the repetition of the data block;

transmitting the SL control information comprises transmitting a separate instance of the SL control information for each of the initial transmission of the data block and the repetition of the data block;

further comprising: listening for SL transmissions by other UEs during segments of the transmission pattern other than the SL transmissions;

the other UE uses a different transmission pattern;

the SL communication resource configuration defines a transmission pattern pool comprising a plurality of transmission patterns;

the method further comprises identifying the transmission pattern among the plurality of transmission patterns of the transmission pattern pool;

the UE belongs to a UE group and the transmission pattern pool comprises a transmission pattern pool configured for the UE group;

identifying the transmission pattern comprises identifying the transmission pattern based on a UE index of the UE;

receiving additional signaling assigning the UE index to the UE;

the additional signaling comprises downlink control information (DCI) signaling;

identifying the transmission pattern comprises selecting the transmission pattern;

selecting the transmission pattern is random;

the SL communication resource configuration further defines a transmission pattern for transmitting the SL control information;

the transmission pattern for transmitting the SL control information is the same as the transmission pattern for transmitting the SL data communication;

the transmission pattern for transmitting the SL control information is different from the transmission pattern for transmitting the SL data communication;

the SL communication resource configuration defines communication resources used for transmitting the SL control information or the SL data communication;

the communication resources comprise at least one of time-domain resources, frequency-domain resources and code-domain resources;

the received message indicating the SL communication resource configuration is a radio resource control (RRC) message or a Medium Access Control layer Control Element (MAC CE) message.

According to another aspect, an apparatus includes: a processor; and a non-transitory computer readable storage medium storing programming for execution by the processor, the programming including instructions to perform such a method as disclosed herein.

For example, a user equipment (UE) could include: a processor; and a non-transitory computer readable storage medium storing programming for execution by the processor, the programming including instructions to: receive, by the UE, a message indicating a sidelink (SL) communication resource configuration to be used by the UE for SL control information and SL data communications between the UE and another UE; transmit, by the UE, SL control information according to the SL communication resource configuration; and transmit, by the UE, an SL data communication according to the SL communication resource configuration, wherein the SL control information and the SL data communication are transmitted by the UE without the UE receiving, in a downlink control information (DCI), a grant of communication resources.

A computer program product could include a non-transitory computer readable storage medium storing programming, the programming including instructions to perform such a method as disclosed herein.

For example, a computer program product comprising a non-transitory computer readable storage medium storing programming, the programming including instructions to: receive, by a UE, a message indicating a sidelink (SL) communication resource configuration to be used by the UE for SL control information and SL data communications between the UE and another UE; transmit, by the UE, SL control information according to the SL communication resource configuration; and transmit, by the UE, an SL data communication according to the SL communication resource configuration, wherein the SL control information and the SL data communication are transmitted by the UE without the UE receiving, in a downlink control information (DCI), a grant of communication resources.

The following features may be provided in apparatus, UE, and/or computer program product embodiments, alone or in any of various combinations:

the instructions to transmit the SL control information comprise instructions to transmit, by the UE, a scheduling assignment (SA) to the other UE using a communication resource defined in the SL communication resource configuration, the SA indicating communication resources used for transmitting the SL data communication;

the SL communication resource configuration comprises a transmission pattern that defines a pattern for transmitting the SL data communication;

the transmission pattern defines an initial transmission of a data block and a repetition of the data block;

the transmission pattern further defines time resources used for the initial transmission of the data block and the repetition of the data block;

the SL communication resource configuration further comprises a starting time of the transmission pattern;

the transmission pattern further defines a time gap from the initial transmission of the data block to the repetition of the data block;

the instructions to transmit the SL control information comprise instructions to transmit one instance of the SL control information for both the initial transmission of the data block and the repetition of the data block;

the instructions to transmit the SL control information comprise instructions to transmit a separate instance of the SL control information for each of the initial transmission of the data block and the repetition of the data block;

the programming further includes instructions to: listen for SL transmissions by other UEs during segments of the transmission pattern other than the SL transmissions;

the other UE uses a different transmission pattern;

the SL communication resource configuration defines a transmission pattern pool comprising a plurality of transmission patterns;

the programming further includes instructions to identify the transmission pattern among the plurality of transmission patterns of the transmission pattern pool;

the UE belongs to a UE group and the transmission pattern pool comprises a transmission pattern pool configured for the UE group;

the instructions to identify the transmission pattern comprise instructions to identify the transmission pattern based on a UE index of the UE;

the programming further includes instructions to: receive additional signaling assigning the UE index to the UE;

the additional signaling comprises downlink control information (DCI) signaling;

the instructions to identify the transmission pattern comprise instructions to select the transmission pattern;

the selection of the transmission pattern is random;

the SL communication resource configuration further defines a transmission pattern for transmitting the SL control information;

the transmission pattern for transmitting the SL control information is the same as the transmission pattern for transmitting the SL data communication;

the transmission pattern for transmitting the SL control information is different from the transmission pattern for transmitting the SL data communication;

the SL communication resource configuration defines communication resources used for transmitting the SL control information or the SL data communication, and the communication resources comprise at least one of time-domain resources, frequency-domain resources and code-domain resources;

the received message indicating the SL communication resource configuration is a radio resource control (RRC) message or a Medium Access Control layer Control Element (MAC CE) message.

BRIEF DESCRIPTION OF THE DRAWINGS

For a more complete understanding of the present disclosure, and the advantages thereof, reference is now made to the following description taken in conjunction with the accompanying drawings, in which:

FIG. 11A is a plot illustrating an example of a configuration of an SA.

FIG. 11B is another plot illustrating an example of a configuration of an SA.

DETAILED DESCRIPTION

Figure 1A:
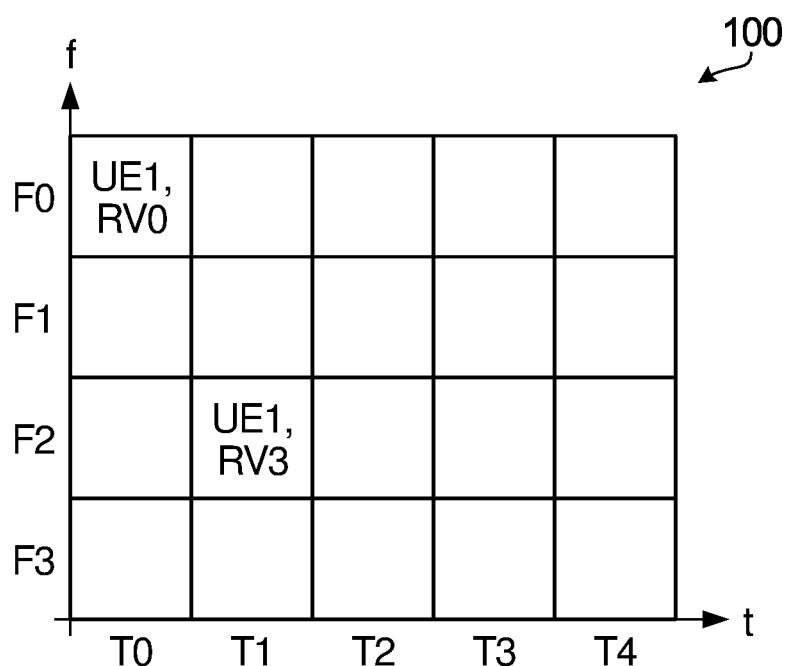
FIG. 1A is a block diagram illustrating an example of a two-dimensional resource configuration for grant-free SL transmission.

For illustrative purposes, specific example embodiments will be explained in greater detail below in conjunction with the figures. It should be appreciated, however, that the present disclosure provides many applicable concepts that can be embodied in a wide variety of specific contexts. The specific embodiments discussed are merely illustrative and do not limit the scope of the present disclosure.

A conventional long-term evolution (LTE) SL transmission scheme relies on the concept of a resource pool (RP) defining a pool of communication resources that are available for SL communication. The SL is used for both transmit (Tx) and receive (Rx) functions, and a UE may not be able to both transmit and receive communications at the same time; it can either transmit or receive sidelink communications at one time. This is because UEs are typically half duplex devices.

The conventional LTE SL transmission scheme includes two transmission modes: a base station-scheduled mode, also known as "LTE mode 3", and a UE autonomous-selection mode, also known as "LTE mode 4".

In LTE mode 3, a BS transmits to a UE control information using a "downlink control information" (DCI), which schedules time-domain and frequency-domain communication resources (from an RP) for SL transmission. This scheduling may be performed dynamically or semi-persistently using a DCI. However, scheduling of the SL transmission resources by the BS results in latency. Before the UE can transmit on the SL, it must wait for the DCI from the BS. Furthermore, the dynamic nature of the resource scheduling increases the signaling overhead associated with an SL transmission.

In LTE mode 4, the UE autonomously selects resources within the RP, which avoids the latency issue associated with LTE mode 3. However, the RP in LTE mode 4 is not designed to prevent two UEs from selecting the same resource for SL communication. Since there is no direct control, by the network or the BS, of the resources used for SL communication within the RP, two UEs can cause a message collision by independently selecting the same resource. When this happens, the collision may cause reliability issues for the message, which may not be successfully decoded by the intended receivers.

Aspects of the present disclosure provide a new SL transmission mode for communications in a wireless network. In this disclosure, the new SL transmission mode may be referred to as a "grant-free transmission mode" or as a mode for data transmissions that are performed without communicating dynamic scheduling.

In conventional UL transmissions, whether grant-based or "grant-free," the BS knows the parameters and resources used for a UL transmission because those parameters and resources are configured by the BS. This greatly reduces the complexity of a UL transmission, and particularly it does not require uplink control signaling to be associated with the UL transmission to indicate the transmission resources and parameters used for the UL transmission. In a grant-based UL transmission, for example, the required transmission parameters are typically communicated to a UE via a Physical Downlink Control Channel (PDCCH). The base station is aware of the identity of the UE sending the UL transmission using the granted UL resources, because the BS specifically granted those UL resources to that UE in a scheduling grant sent in the PDCCH.

In a conventional UL grant-free transmission from a UE to a BS, for example, different UEs could send UL transmissions using UL communication resources configured semi-statically in UE-specific RRC signaling, without specifically requesting use of the resources in a dynamic manner, and without receiving a dynamic scheduling grant of the resources sent in a DCI by the BS. The grant-free transmission typically achieves low latency and reduced scheduling overhead as compared to the grant-based UL transmission. The BS receiving the grant-free UL transmission knows the communication parameters of the UL transmission because the BS has previously configured the UE performing the grant-free UL transmission semi-statically. Although the BS might not have complete information about which UE, if any, is sending a grant-free UL transmission at a particular moment of time if multiple UEs are configured to be able to access the same resources, the BS is able to detect the grant-free transmissions and determine the UE based on the configuration parameters (for example using Demodulation Reference Signal (DMRS) parameters and time and frequency resources).

While it is generally desirable to achieve the advantages of grant-free transmission for SL communications between UEs, the nature of SL communications creates particular challenges for implementing grant-free transmissions. In contrast to UL grant-free transmissions where the receiver is a BS with high awareness, both the transmitter and receiver are UEs in SL grant-free transmissions. Therefore, the receiving UE is not aware of the transmitting UE's configuration parameters, such as which UE is transmitting, the ultimate target of the data (for example, another UE), the time-domain and frequency-domain communication resources used for the transmission, and other control information.

The present disclosure presents a new grant-free transmission mode for SL transmission, which includes an SL control channel, also known as scheduling assignment (SA), or sidelink control information (SCI), to mitigate the challenges associated with implementing grant-free transmissions in SL communications. The SL control channel may include control or configuration information such as information indicating which UE is transmitting, the target UE or BS for data, the time-domain and frequency-domain communication resources used for the transmission, and/or other configuration information. A receiving UE may decode the SL control channel first to obtain this information before decoding the data transmission.

Grant-free transmissions are sometimes called "grant-less", "schedule free", or "schedule-less" transmissions. Grant-free SL transmission can also be referred to as SL "transmission without grant", "transmission without dynamic grant", "transmission without dynamic scheduling", or "transmission using configured grant", for example.

In various embodiments, the transmitting UE indicates its specific SL transmission pattern to a destination UE or multiple destination UEs in the SL control channel. The SL transmission pattern is configured by the BS, to enable grant-free SL communications. The specific SL transmission pattern allows a grant-fee SL communication from one UE to avoid colliding with a grant-free SL communication of another UE.

The term collision as used herein refers to a situation in which multiple UEs are transmitting signals using the same communication resource or overlapping communication resources, such that the multiple UEs' transmission signals may interfere with each other, making it more difficult for receivers to decode the transmitted signals. For example, a collision occurs when UEs that are transmitting in the same time-frequency resource in the same time slot.

Collision represents an example of a scenario in which an SL transmission by a UE might not be received by another UE. Half duplex devices, as noted above, can either transmit or receive sidelink communications at any time. A half duplex UE cannot receive an SL transmission while it is also transmitting. SL transmission patterns could also or instead be used to mitigate a problem of a UE missing signals from one or more other UEs due to the UE transmitting at the same time as the one or more other UEs.

An SL transmission pattern represents a sparse set of communication resources. More specifically, the SL transmission pattern defines how communication resources are to be used by UEs for SL transmissions; accordingly, the SL transmission pattern may also be known as a resource pattern. The SL transmission pattern can be designed to enable all UEs in a cooperation group to communicate with each other even if some transmissions are transmitted in a grant-free manner (that is, without dynamic scheduling). This could be especially useful in applications such as V2X and UE cooperation, and/or other applications as well.

In some embodiments, the transmission pattern indicates a number of "on" or usable resources within the time window of the transmission pattern. In a time-frequency based transmission pattern, for example, the UE transmits using time-frequency communication resources in time slots that are designated as "on" time slots by the transmission pattern, and receives in time slots that are not designated as "on" time slots (or are otherwise designated as "off" time slots) by the transmission pattern. In this sense, a transmission pattern could be considered a form of "on-off" pattern in some embodiments.

The transmission pattern (or, in some embodiments, the on-off pattern) may define the resources used for a number of transmissions of a transport block (TB). The transmissions may include the initial transmission and retransmissions of the same TB. The initial transmission and retransmission of the TB may sometimes also be referred to as repetitions. In some embodiments, each transmission pattern represents transmissions of one transport block (TB); that is, a UE should start initial transmission of a TB at the first "on" slot in the transmission pattern, and continue repetition of the TB on all the "on" slots until the end of the "on" slots defined by the transmission pattern. In this type of application, a transmission pattern (or on-off pattern) could be considered a repetition pattern. In some embodiments, a UE also listens to other UE's transmissions in the "off" slots defined by the transmission pattern or any slot that is not defined as an "on" slot in the transmission pattern. This can be done by checking whether there is an SA transmitted from other UEs, and if an SA is detected, the UE further checks whether the associated data transmission is destined to the UE, and if so, the UE uses the information from the SA to further decode the data transmission that is destined to the UE. Alternatively, in other embodiments, a UE listens to other UEs or checks other UE's SL control information as long as it is not transmitting in the same slot.

The present disclosure also provides signaling mechanisms for the proposed grant-free SL communications. As described above, SL control channels may be used to accommodate SL data transmission. Some embodiments described herein outline signaling mechanisms for grant-free SL communications using transmission patterns.

In some embodiments, a UE is configured to use a transmission pattern defining or otherwise indicating communication resources that are allotted or allocated to the UE over a specific time interval for SL communications. Other UEs are similarly configured to use respective transmission patterns over this time interval. A UE can transmit and receive SL transmissions within a time interval using these communication resources according to its transmission pattern. A half duplex UE might still be transmitting at certain times while other UEs are transmitting, but transmission patterns could be designed to provide an opportunity for each UE to receive SL transmissions from all other UEs at least once during the time interval if all UEs are configured and transmitting during the time interval using their respective transmission patterns.

Time is one dimension that may be used in defining communication resource usage in a transmission pattern. Other dimensions, such as frequency, code, and/or signature, are also contemplated.

Transmission patterns may belong to a transmission pattern set or pool that is common to a group of UEs. RRC signaling may be used to configure the transmission pattern for a UE and/or a transmission pattern pool, as well as the communication resources for SL data and control. A transmission pattern or transmission pattern pool may also be signaled by broadcast signaling (for example in a system information block (SIB)). Alternatively, a UE may be pre-configured to use a specific configuration.

In an embodiment referred to as a first SL transmission mode, an example of distributed grant-free communication is provided. In this embodiment, RRC signaling configures a transmission pattern for a specific UE.

In an embodiment referred to as a second SL transmission mode, another example of distributed grant-free communication is provided. RRC and system information block (SIB) signaling configure or pre-define a transmission pattern pool, and a UE randomly selects a transmission pattern from within the transmission pattern pool. A common transmission pattern pool can be defined for RRC_idle and RRC_inactive UEs, for example.

The above embodiments are distinct from conventional SL transmission modes. Compared to LTE mode 3, in which the resource is dynamically or semi-persistently scheduled by a DCI, the resource is semi-statically configured without a dynamic grant in the first and second SL transmission modes introduced above. Furthermore, the scheduling in these first and second SL transmission modes may be accomplished by RRC signaling, rather than DCI signaling in LTE mode 3. Compared to LTE mode 4, the UE in these first and second SL transmission modes does not perform completely autonomous resource selection, because the UE transmits according to a configured transmission pattern or patterns. In some embodiments, RRC signaling is used to configure the UE with a transmission pattern(s) in order to mitigate potential collisions or reduce the impact of the half duplex constraint between the SL transmissions of the UE and SL transmissions of other UEs.

Furthermore, in LTE V2X, the UE may be configured with a receive RP similar to a transmitter RP, where a UE should listen to all channels within the receive RP. In grant-free SL transmission modes described herein, there is no need to configure a transmit and receive RP.

Embodiments disclosed herein also differ from NR's configured grant or grant-free UL transmission in several aspects. First, some of the embodiments disclosed herein relate to grant-free SL transmissions, and therefore the resource configuration for these transmissions is for different channels than in UL transmission. For example, in the SL, the PSSCH (physical sidelink shared channel) and PSCCH (physical sidelink control channel) may be configured, as opposed to the PUSCH (physical uplink shared channel) in the UL. Second, in UL transmissions, the receiver (a BS, for example) knows the resource configuration of the UL, as described above. In contrast, in the SL, resource configuration is not known by the receiver (a UE, for example). Third, in configured grant UL transmission, only a repetition number can be configured, not a transmission pattern. In NR's configured grant UL transmission, the repetitions according to the repetition number, if configured, are performed in the slot immediately following initial transmission. This is because NR UL does not have the issue of half duplex constraint as all UEs only transmit in the UL and do not need to listen in the UL.

In distributed grant-free mode for SL transmission as disclosed herein, a UE could use a transmission pattern to transmit and retransmit a data block with a fixed repetition number according to the transmission pattern, without any hybrid automatic repeat request (HARQ) feedback. In this type of application, a transmission pattern could be considered a repetition pattern.

In further embodiments, a transmission pattern pool can be applied to UE groups for UE cooperation. A UE may select a transmission pattern from the transmission pattern pool according to its UE index or the UE may randomly select a transmission pattern from the transmission pattern pool, for example.

In some embodiments, the SL transmission may use cyclic-prefix (CP) orthogonal frequency division multiplex (OFDM), similar to the waveform used for LTE downlink transmission. In some embodiments, the sidelink transmission uses single carrier frequency division multiple access (SC-FDMA), similar to the waveform used for LTE uplink transmission. In some embodiments, the sidelink transmissions use non-orthogonal multiple access (NOMA), such as: sparse code multiple access (SCMA), interleave-grid multiple access (IGMA), multi-user shared access (MUSA), low code rate spreading, frequency domain spreading, non-orthogonal coded multiple access (NCMA), pattern division multiple access (PDMA), resource spread multiple access (RSMA), low density spreading with signature vector extension (LDS-SVE), low code rate and signature based shared access (LSSA), non-orthogonal coded access (NOCA), interleave division multiple access (IDMA), repetition division multiple access (RDMA), or group orthogonal coded access (GOCA).

Illustrative embodiments will now be described in more detail below.

FIG. 1A is a block diagram illustrating an example of a two-dimensional resource configuration for grant-free SL transmission. FIG. 1A illustrates a resource grid 100, which includes frequency-domain resources F0, F1, F2 and F3, and time-domain resources T0, T1, T2, T3 and T4. Each combination of frequency-domain resource and time-domain resource forms a communication resource, in this example a time-frequency communication resource, for SL transmission. FIG. 1A also illustrates a transmission pattern for a UE1. Resource grid 100 indicates a time-frequency communication resource for two transmissions by UE1, as well as a redundancy version (RV), RV0 or RV3, in a label on each communication resource.

In FIG. 1A, UE1 is configured with a transmission pattern, which explicitly defines the transmission repetition number as well as the communication resources for each repetition. Each repetition may also be associated with an RV, which can be predefined or preconfigured (for example, configured using a UE specific RV sequence indicating the associated RV for each repetition). A single UE index is used to indicate both time-domain and frequency-domain resources in FIG. 1A. In general, a UE index corresponds to a specific UE or a UE group. The communication resources assigned to UE1 form the transmission pattern for UE1.

The resource grid 100 has a frequency-domain length of 4 and a time-domain length of 5. In the time-domain, T0 to T4 could be slots, mini-slots, symbols, or any other quantization or unit of time. In the frequency-domain, F0 to F3 could be frequency sub-channels, combinations of sub-channels, resource blocks, resource block groups (RBGs), bandwidth parts (BWPs), subcarriers, a number of subcarriers, carriers or any other quantization or unit of frequency. Different frequency domain sub-channels are just an example. Sub-channels can instead be associated with different layers of non-orthogonal multiple access (NOMA), different pilot resources, and/or other resources. Although shown as time-domain resources and frequency-domain resources in FIG. 1A, in general the transmission pattern could also or instead include code-domain resources (such as sparse code multiple access), space-domain resources, and/or different demodulation reference signals (DMRS). Moreover, the transmission patterns are not limited to two dimensions, and therefore could include a number of dimensions greater or less than two.

In some embodiments, frequency-domain resources, pilots and layer index are associated with time-domain signatures. For example, as an alternative to using a UE index, the resource grid 100 could indicate only the time-domain signature or time-domain transmission pattern, and other dimensions (for example the frequency-domain dimension) may be derived from it.

Figure 1B:
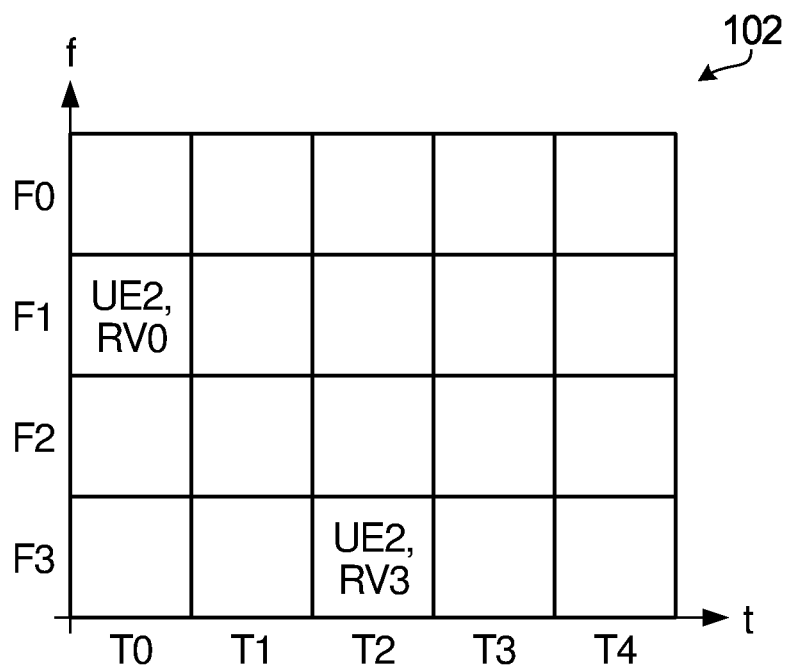
FIGS. 1B-1K are block diagrams illustrating other examples of two-dimensional resource configurations for grant-free SL transmission.
Figure 1C:
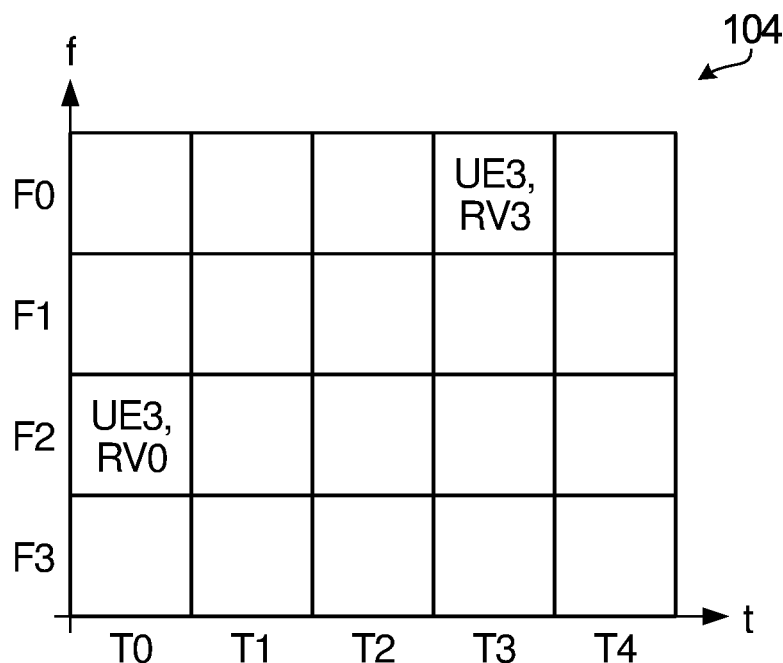
Figure 1D:
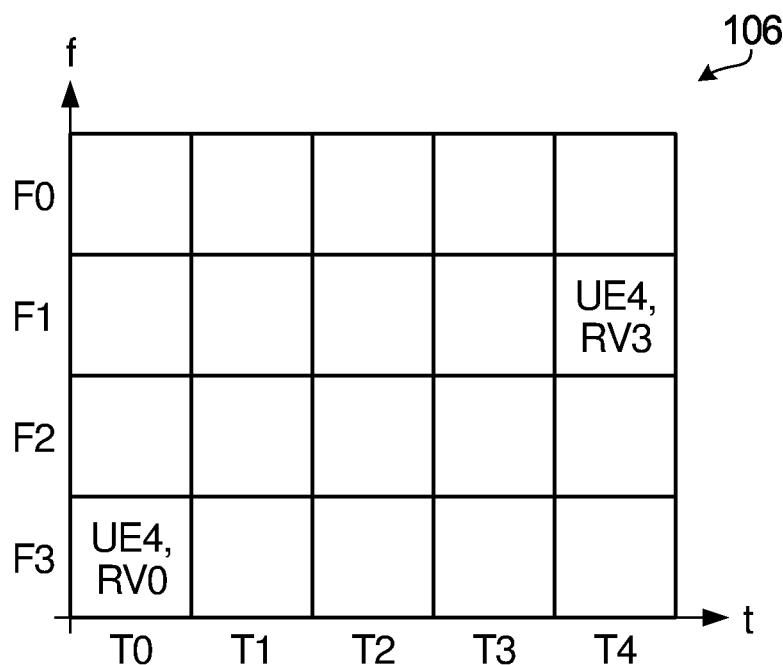
Figure 1E:
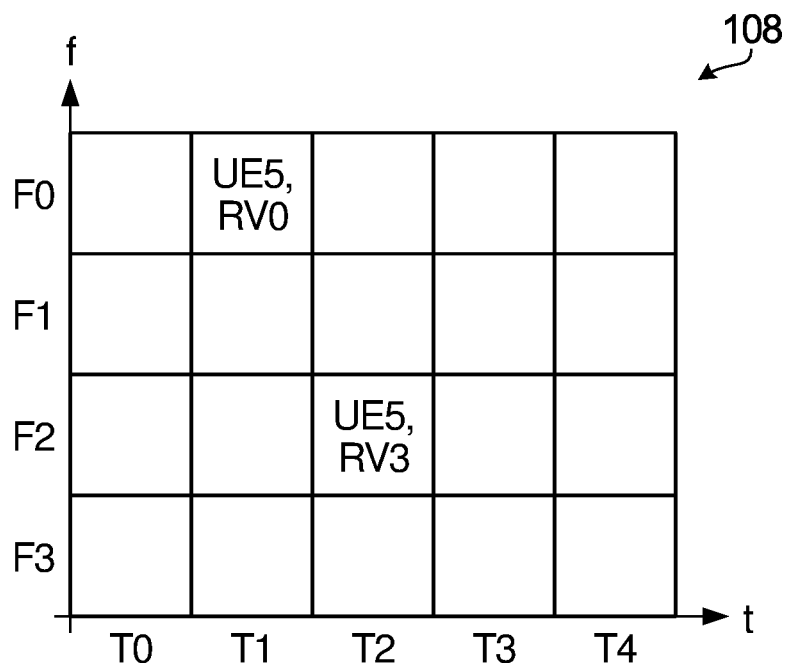
Figure 1F:
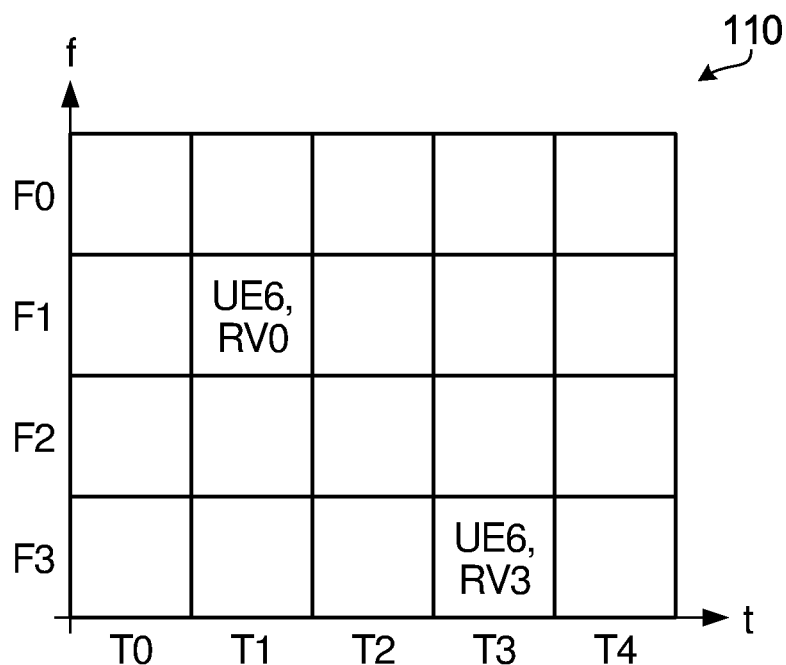
Figure 1G:
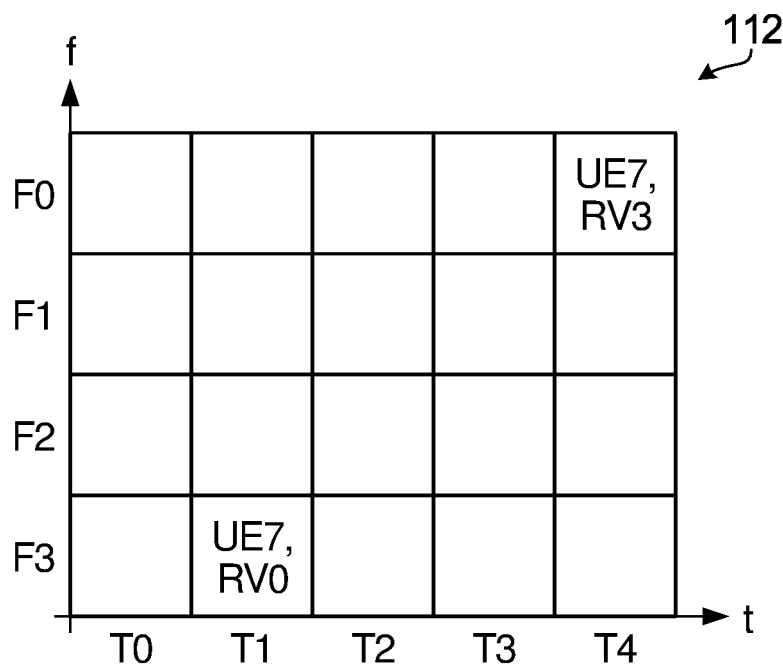
Figure 1H:
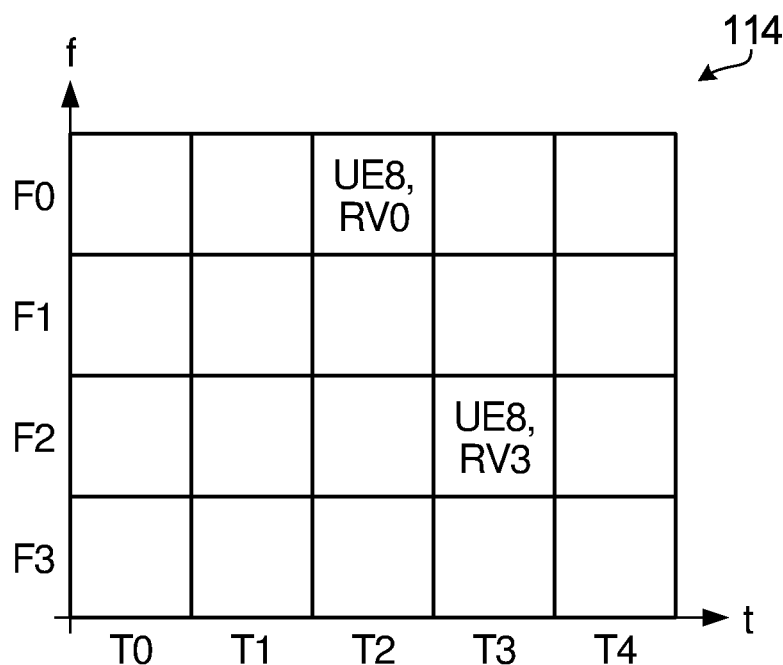
Figure 1I:
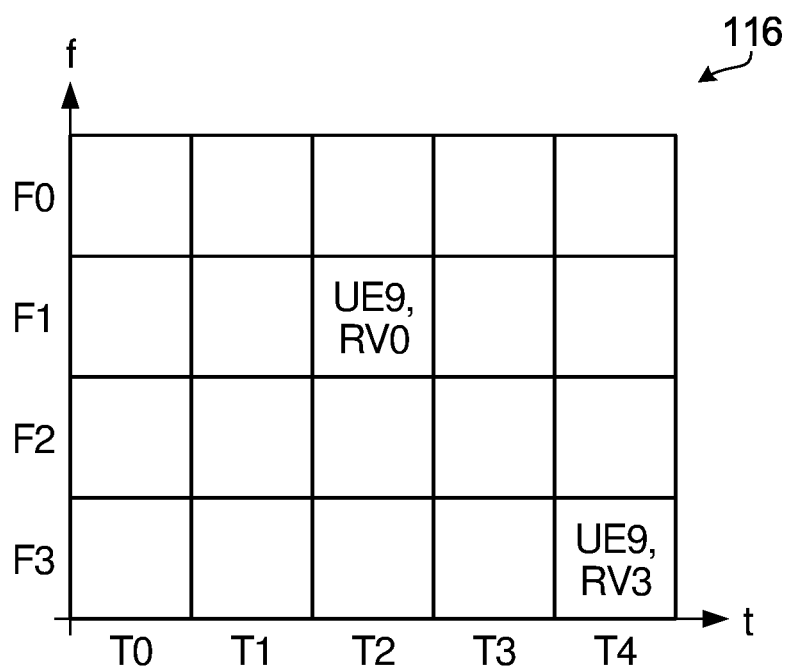
Figure 1J:
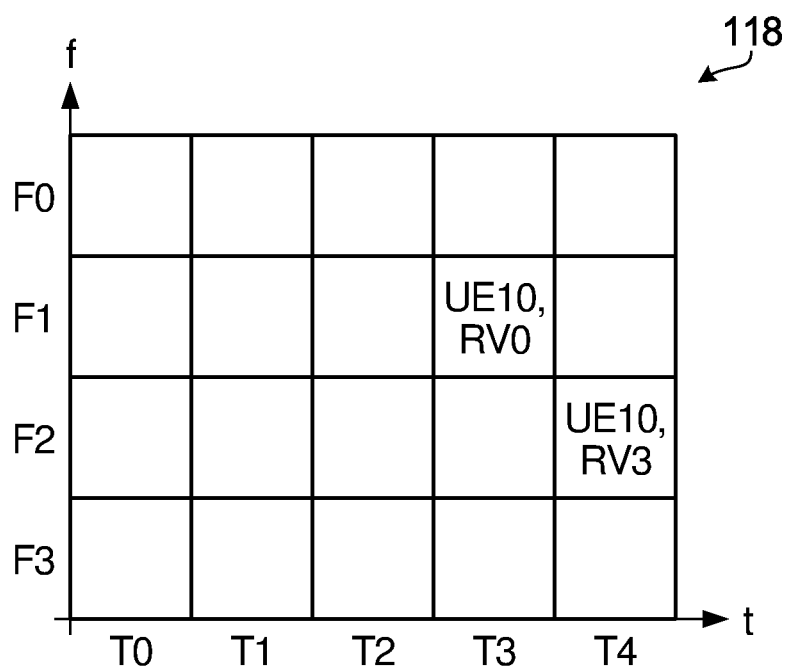

FIG. 1B is another block diagram illustrating an example of a two-dimensional resource configuration for grant-free SL transmission. FIG. 1B illustrates a resource grid 102. Resource grid 102 includes the same frequency-domain resources F0, F1, F2 and F3, and time-domain resources T0, T1, T2, T3 and T4 as resource grid 100 in FIG. 1A. FIG. 1B also illustrates a transmission pattern for UE2.

Resource grid 102 indicates time-frequency communication resources for two transmissions by UE2, as well as a redundancy version (RV0 or RV3) in a label on each communication resource. These time-frequency communication resources define the transmission pattern for UE2. The time-frequency communication resources indicated in resource grid 102 for UE2 are different from the time-frequency communication resources indicated in resource grid 100 for UE1.

FIGS. 1C, 1D, 1E, 1F, 1G, 1H, 1I and 1J are further block diagrams illustrating other examples of two-dimensional resource configurations for grant-free SL transmission. FIGS. 1C, 1D, 1E, 1F, 1G, 1H, 1I and 1J illustrate resource grids 104, 106, 108, 110, 112, 114, 116 and 118, respectively, each resource grid including the same frequency-domain resources F0, F1, F2 and F3, and time-domain resources T0, T1, T2, T3 and T4 as resource grid 100 in FIG. 1A. Resource grids 104, 106, 108, 110, 112, 114, 116 and 118 each indicate communication resources defining the transmission patterns for UE3, UE4, UE5, UE6, UE7, UE8, UE9 and UE10, respectively, as well as a redundancy version (RV0 or RV3) in a label on each communication resource. Each communication resource assignment or allocation indicated by resource grids 100, 102, 104, 106, 108, 110, 112, 114, 116 and 118 is unique.

Figure 1K:
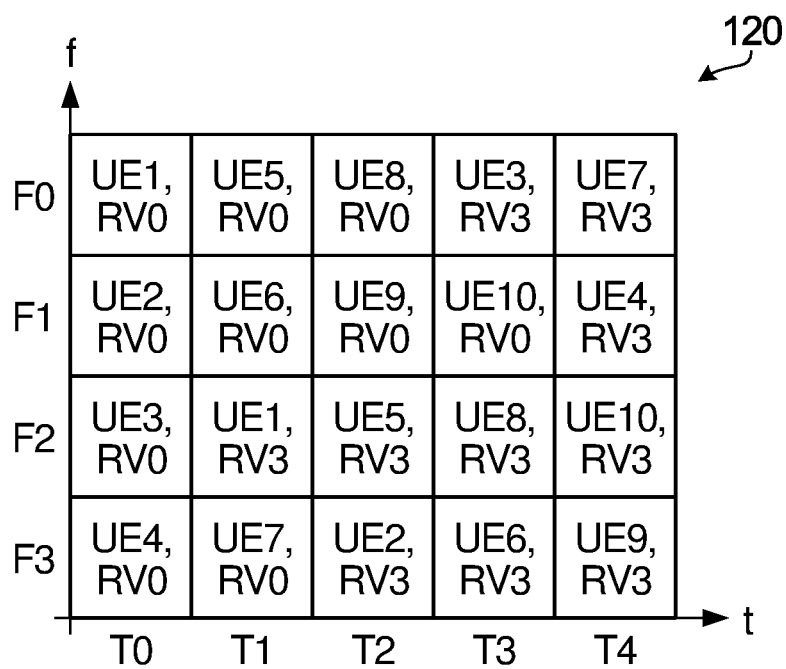

FIG. 1K is yet another block diagram illustrating a two-dimensional resource configuration for grant-free SL transmission. FIG. 1K illustrates resource grid 120, which also includes the same frequency-domain resources F0, F1, F2 and F3, and time-domain resources T0, T1, T2, T3 and T4 as resource grid 100 in FIG. 1A. Resource grid 120 is a superposition of resource grids 100, 102, 104, 106, 108, 110, 112, 114, 116 and 118. Therefore, resource grid 120 may be considered to indicate a transmission pattern pool, which includes the transmission patterns for UE1-UE10.

The communication resources illustrated in FIG. 1K are used for SL transmission by respective UEs, according to their transmission patterns. In general, each communication resource represents a potential transmission of a transport block (TB). The same TB is used in each transmission by a UE over the length of a transmission pattern. There may be control information (SA) associated with the TB to be transmitted on separate resources in PSCCH channel.

In FIG. 1K, according to their respective transmission patterns, each UE transmits a TB twice over the length of the configured transmission pattern, and therefore the repetition number of each transmission pattern is 2. As explained below, this allows each UE receive at least one transmission of a TB by the other UEs.

UE1 cannot receive in T0 and T1 because of the half duplex constraint. As such, UE1 cannot receive the first transmission of UE2, UE3 and UE4. However, by virtue of the configuration of the transmission pattern pool or UE specific transmission pattern, UE1 is able to receive the second transmissions of UE2, UE3 and UE4 in at least one time slot over the length of the transmission pattern, which is five time slots in this example.

Regarding reception, UEs could resolve transmissions from different transmitting UEs in any of various ways. In the example shown in FIG. 1K, UE5 to UE10 could differentiate the transmissions received from UE1 to UE4 in T0 using the frequency-domain dimension. Another example is that UE1 to UE4 may have overlaps in time and frequency domain resources for their first transmission, but they may use different codebook/spreading codes or layers to resolve the collision using orthogonal codes or non-orthogonal multiple access (NOMA) transmission schemes.

In general, the repetitions of each UE transmission by a UE over the length of a transmission pattern transmit the same TB. However, the RVs associated with the repetitions may be configured differently. In the example shown in FIG. 1K, different RV sequences are used in each repetition. Thus, repetitions of a TB by a UE might not necessarily be exactly the same. Repetitions could use different coding parameters such as different RV sequences, for example, to increase the likelihood that a subsequent repetition can be correctly decoded by a receiving UE after failure of a previous transmission of the same data block or transport block. Each repetition may also be associated with an RV that can be the same or different for different repetitions of the TB, and in some embodiments the RV for each repetition is predefined or preconfigured (for example, configured using a UE specific RV sequence indicating the associated RV for each repetition).

At a receiving UE, each transmission from a transmitting UE may be independently decoded. Alternatively, transmissions from multiple UEs in the case of UE cooperation during a multicast phase and cooperation phase(s) may be jointly decoded by the receiving UE.

In some embodiments, low density spreading (LDS) may be applied in the time-domain to transmissions. More generally, any other type of symbol level or bit level spreading used in a multiple access scheme can be applied to time domain defined by a transmission pattern instead of frequency domain for such transmissions. For example, a transmission symbol may be multiplied by a spreading sequence and the output symbol is spread at different time slots of the transmission pattern.

In some embodiments, the transmission resources in the "on" slot of the transmission pattern may be combined together to transmit a bigger transport block.

In some embodiments, each transmission resource in the "on" slot of the transmission pattern is used to transmit independent packets. It should be understood that FIGS. 1A-1K provide possible examples of a transmission pattern configuration and transmission pattern pool. Other transmission pattern pools using different numbers of time-domain resources, frequency-domain resources, and/or other communication resources are possible. In addition, other configurations of transmission patterns included in the transmission pattern pool are possible. For example, for a two-dimensional transmission pattern pool with a repetition number (K) of 2, a length of frequency-domain resources of (M), and a length of time-domain resources of (N=M+1), the number of transmission patterns the transmission pattern pool can support and allow for each UE to receive a transmission by each other UE in at least one transmission/reception slot could be defined as:

$$\text{number of repetition patterns} = \frac{M * N}{K}. \quad (1)$$

Figure 2:
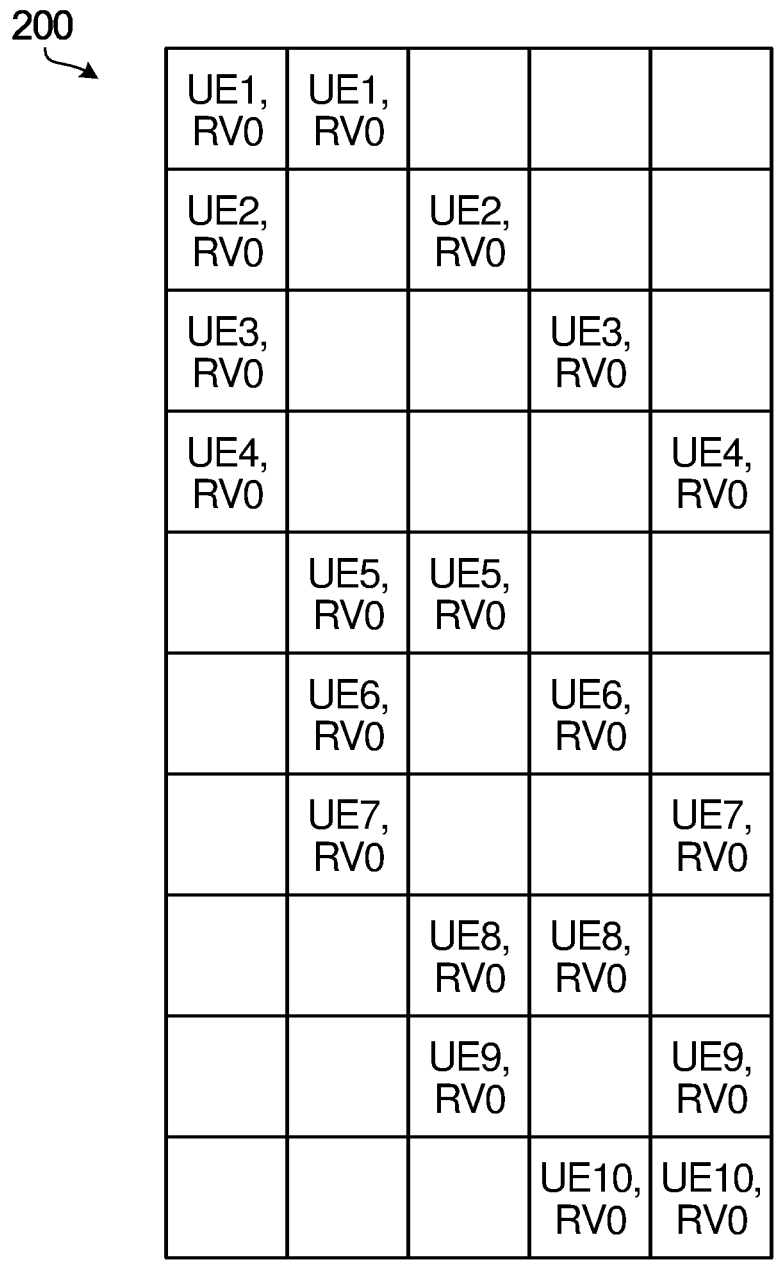
FIG. 2 is a block diagram illustrating another example of another two-dimensional resource configuration for SL transmission.

FIG. 2 is a block diagram illustrating another example of another two-dimensional resource configuration for SL transmission. FIG. 2 illustrates resource grid 200. FIG. 2 also illustrates a UE index (identified as UE1, UE2 . . . or UE 10) and an RV sequence (which is {0 0 0 . . . 0} indicating that every transmission uses RV0) assigned to each communication resource.

In FIG. 2, as in FIG. 1K, each UE index (UE1 to UE10) is configured with a transmission pattern, which defines the transmission repetition number as well at the communication resources for the repetitions. A single UE index is used to indicate both communication resource domains (time and frequency domain or time and code domain, for example). The communication resources assigned to UE1 are part of the transmission pattern for UE1. Similarly, the communication resources assigned to UE2 to UE10 are part of the transmission patterns for these UE indexes. The collection of these transmission patterns forms a transmission pattern pool.

A UE may be configured with a transmission pattern pool and randomly select a transmission pattern from the transmission pattern pool. In one embodiment of configuring the transmission pattern pool, a repetition number (K) and a length of the transmission pattern are indicated. In one embodiment, all transmission patterns that satisfy the K and length parameters and a given range and partition of time granularity (for example slot T0 to T4 in FIG. 1K) and frequency sub-channels (for example F0 to F3 in FIG. 1K) that are included in the transmission pattern pool are considered to be the candidate transmission patterns among the pattern pool. The range and partition of the frequency sub-channels (F0 to F3 in FIG. 1K) may also be indicated for the transmission pattern pool. In another embodiment, not every possible transmission pattern that satisfies the K and length parameters are necessarily included in the transmission pattern pool. Only a subset of all of the possible transmission patterns could be selected for the pool. An example of such subsets of possible transmission patterns among the pattern pool are the transmission patterns corresponding to UE1 to UE10 as indicated in FIG. 1K. A UE may also be configured with starting time location of the transmission pattern for the transmission pattern pool configuration.

In order for a UE to transmit without dynamic grant on the SL according to a transmission pattern, the transmission pattern or transmission pattern pool must somehow be determined or otherwise obtained by or known to the UE, and could be signaled to the UE. The signaling of transmission patterns and/or transmission pattern pools could be done through, for example, system information blocks (SIB), cell specific RRC signaling, UE specific RRC signaling and/or DCI signaling.

The different dimensions of the resource configuration could be configured separately using UE specific RRC signaling. Alternatively, a combination of two or more of time-domain, frequency-domain, code-domain, DMRS and other resources could be configured together using a single UE index. The signaling of the UE index can be UE specific RRC signaling or any of the signaling methods described herein. The mapping between the UE index and communication resources in a transmission pattern may be performed by a UE, or may be predefined and/or signaled to the UE by RRC signaling. The mapping may be in a form of a mapping table or a rule or equation that defines the resources in different dimensions for a given UE index. In some embodiments, the mapping table or rule, if predefined, is such that each UE is able to receive at least one transmission from each of the other UEs. As in the example shown in FIGS. 1A, 1B, and 1K, the transmission of two different UEs (for example UE1 and UE2) in the same slot may be mapped to different frequency subchannels. In addition, if two UEs (or UE indices) have a first transmission of a TB at the same time slot, then their second transmission should be mapped to different time slots to overcome the half duplex constraint. For example, for K=2, a one to one mapping of M (M=4 in FIG. 1A-1K) frequency-domain resources can be created with an M+1 length time-domain pattern, to support M*(M+1)/2 time-frequency channels to be allocated to M*(M+1)/2 different UEs.

In some embodiments, a transmission pattern is defined on resources that are included in a configured RP, or without explicitly configuring an RP.

Figure 3A:
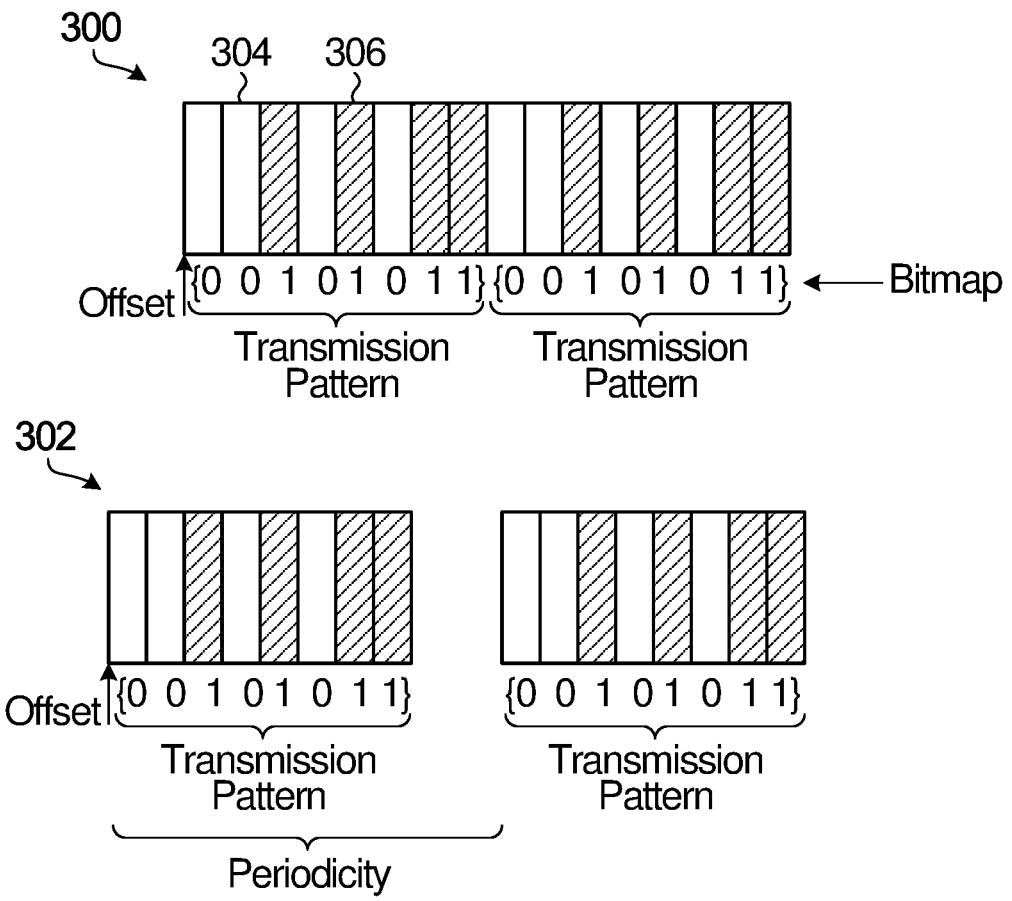
FIG. 3A is a block diagram illustrating an example of two different ways of configuring a transmission pattern for a time-domain resource configuration.

FIG. 3A is a block diagram illustrating an example of two different ways of configuring a transmission pattern for a time-domain resource configuration. FIG. 3A includes transmission patterns 300, 302, which include "off" slots (one of which is labeled as 304) in which a UE does not transmit, and "on" slots (one of which is labeled as 306) in which a UE may perform SL transmissions. SL transmissions may include, for example, V2X transmissions. In general, "on" slots 304 and "off" slots 306 define the transmission patterns. Although referred to primarily as slots, each slot 404, 406 could be, for example, a subframe, a mini-slot, an OFDM symbol, a number of OFDM symbols or any other time unit.

The transmission patterns 300, 302 of FIG. 3A also include an offset, which indicates the starting location of the transmission patterns, and could be a slot index or identifier or an offset from a particular slot or the start of a frame for example. The transmission pattern 302 also includes a periodicity, which defines a time gap between starting locations of two adjacent transmission patterns where the transmission patterns may periodically occur over time.

Each transmission pattern may be represented using a bitmap, as shown. In the bitmap {00101011} in FIG. 3A, a "1" represents a time unit (for example an "on" slot 306) that is available for SL transmission and a "0" represents a time unit (for example an "off" slot 304) in which an SL transmission is not performed by a UE that is using the patterns 300, 302. The bitmap may repeat itself without a gap between adjacent repetitions as shown at 300, or with a gap as shown by the periodicity at 302.

The number of "on" slots 306 within one transmission pattern, four in the examples shown in FIG. 3A, represents the repetitions number (K) for a repetition pattern, or more generally the communication resources that may be used for SL transmissions. As described earlier, the transmission pattern may define the resources used for a number of transmissions of a TB. The transmissions may include the initial transmission and retransmissions of the same TB. The initial transmission and retransmission of the TB may sometimes also be referred to as repetitions. In some embodiments, each transmission pattern represents transmissions of one transport block (TB); that is, a UE should start initial transmission of a TB at the first "on" slot 306 in the transmission pattern, and continue repetition of the TB on all the "on" slots 306 using an RV corresponding to the configured or predefined RV sequence until the end of the time defined by the transmission pattern. Thus, in some embodiments, the transmission pattern indicates the repetition number (K).

In some embodiments, a UE may also listen to other UE's transmissions in the "off" slots defined by the transmission pattern or any slot that is not defined as an "on" slot in the transmission pattern. This can be done by checking whether there is an SA transmitted from other UEs. If an SA is detected, then the UE may further check whether the associated data transmission is destined to the UE, and if so, then the UE may use the information from the SA to further decode the data transmission that is destined to the UE. Alternatively, a UE may listen to other UEs or check other UE's SL control information as long as it is not transmitting in the same slot.

Control signaling to configure transmission patterns could include a bitmap as shown in FIG. 3A. Signaling could also indicate the offset/starting point of the transmission pattern.

As illustrated by the transmission pattern 300, the offset or starting time location defines a starting time location of one transmission pattern, and the transmission pattern could repeat among all available slots, such as all slots in a larger frame. For example, the transmission pattern could repeat within a larger time frame, for example 10240 subframes, excluding DL only or DL dominant slots. The larger time frame can be the length defined by the maximum allowable system frame number (SFN). For example, in LTE or NR, the maximum SFN is 1024 and each system frame consist of 10 subframes, thus the larger time frame is equal to 10240 subframe or 10240 ms with each subframe equal to 1 ms. In some embodiments, at the end of the larger time frame (10240 subframes for example), there might not be enough additional subframes for another complete repetition of the transmission pattern. Instead of having a transmission pattern "split" across a time frame boundary, with a partial transmission pattern after 10240 subframes and continuing in the next 10240 subframes, the transmission patterns could have the same relative location within each set of 10240 subframes. In other words, the transmission pattern may be defined within a larger time frame, where the starting location and periodicity are defined as the location within the larger time frame, and different larger time frames have the same relative location of transmission patterns.

As shown at 302, the periodicity could define the time domain gap between starting locations of two adjacent transmission patterns, such as when there are otherwise allocated resources or some other gap between two adjacent transmission patterns. The resources for the transmission pattern may occur periodically, and that is defined by the offset and periodicity in some embodiments, where offset indicates the starting time location of a transmission pattern and the transmission pattern appears periodically with the gap between two transmission patterns as periodicity. In some cases, a BS may signal the periodicity using RRC signaling.

Figure 3B:
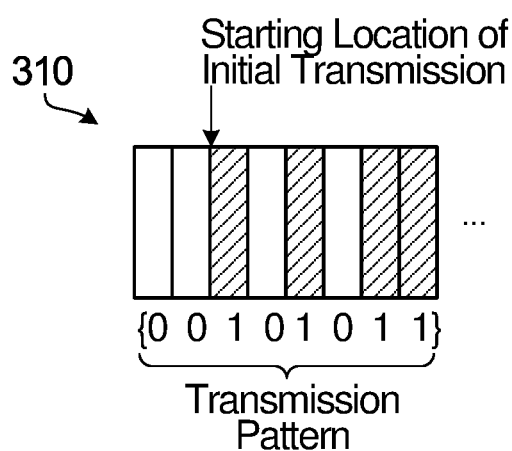
FIG. 3B is a block diagram illustrating another example of how a transmission pattern could be configured.

In some embodiments, instead of indicating the starting time location of the transmission pattern, a BS may instead indicate the starting time location of the initial transmission of the TB. An example of such indication of the starting time location is shown in FIG. 3B, which is a block diagram illustrating another example of how a transmission pattern 310 could be configured.

In other embodiments, the bitmap that indicates the transmission pattern always start with '1', in which case, the starting time location (offset) of the transmission pattern is the same as the starting time location of the initial transmission of a TB. A transmission pattern as shown at 310 could then be configured with a bitmap {101011}, a starting location of the initial transmission, and a periodicity. Another possible configuration, if transmission patterns repeat without a gap as in FIG. 3A, could use a bitmap {10101100} and a starting location of the initial transmission, with the trailing zeros at the end of the bitmap instead of leading zeros for non-transmission slots.

Figure 4:
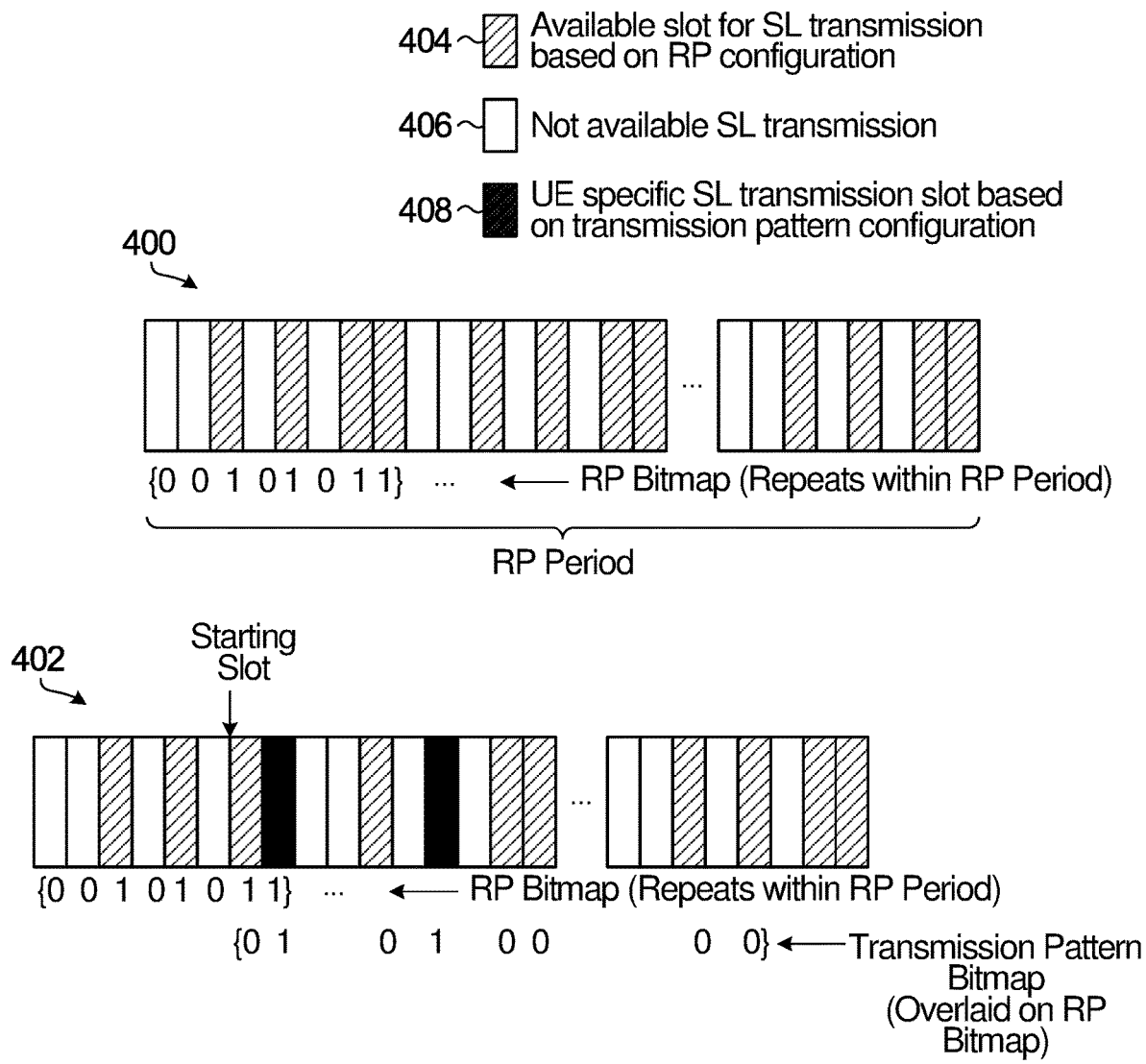
FIG. 4 is a block diagram illustrating an example of a transmission pattern that is defined within a configured resource pool (RP).

FIG. 4 is a block diagram illustrating an example of a transmission pattern that is defined within a configured RP. This is an example of including a transmission pattern in an RP, or transmission pattern configuration on top of (or overlaid on) RP configuration. FIG. 4 includes RPs 400, 402. The RPs 400, 402 include slots, which as noted above with reference to FIG. 3A could be other types of time units. FIG. 4 also illustrates an RP period and a starting slot.

Two types of slots are shown in the RP 400. Slots 404 are available for SL transmissions, and slots 406 are not available for SL transmissions. The configuration of the RP can be cell specific or UE specific, for example in UE specific or cell specific RRC signaling or system information.

The RP 402 is overlaid with a transmission pattern. Slots 408 in the RP 402 represent particular ones of the available slots 304 that are transmission slots or "on" slots in a transmission pattern configuration for a particular UE. In other words, slots 408 may correspond to transmission slots included in the transmission pattern for a UE. Other SL-available slots in 402 do not correspond to transmission slots in the transmission pattern, and therefore a UE that is using the example transmission pattern shown in FIG. 4 could use these slots to listen for transmissions from other UEs.

The RP period is the length of time over which the RPs 400, 402 repeat. In some embodiments, the RP period is 10240 ms, corresponding to 1024 frames defined using system frame number (SFN), where each frame is 10 ms and contains 10 subframes of 1ms each.

The RPs 400, 402 may be represented using a resource bitmap{00101011}, where a "1" represents a time unit (for example a slot) that is available for SL transmission and a "0" represents a time unit that is not available. The time unit can be a slot, a subframe, a mini-slot, an OFDM symbol, a number of OFDM symbols or any other time unit. The resource bitmap may repeat within the RP period as shown in FIG. 4.

A starting time unit (for example a slot) for the transmission pattern may also be indicated, as shown by way of example in RP 402. In this example, the repetition number, which is the number of repetitions (including initial transmission) or transmissions to be performed by the UE for a TB in some embodiments, could be explicitly signaled as a value K=2 or implicitly indicated through the "on" slots in the transmission pattern. Further, the transmission pattern that is overlaid on RP 402 may also be presented in a time-domain transmission pattern bitmap beginning at the starting slot, and in this example the bitmap is {01010000}.

The starting slot, or in general, the starting time location, may be indicated as an offset, which defines the actual time location of the beginning of the transmission pattern. The offset can indicate an absolute time location or a time location with respect to SFN=0; that is, the location within the duration defined by the maximum system frame number. The offset may be defined as a slot number, a symbol number or any other granularity of time unit. For example, with a maximum SFN of 1024 as in LTE or NR, the offset may define a slot number within 1024 frames or 10240 subframes. In a time-domain transmission pattern bitmap, a "1" corresponds to an "on" transmission slot (or in general a transmission time unit) in the transmission pattern for a specific UE, and a "0" corresponds to an "off", non-transmission slot in the transmission pattern for a specific UE.

As shown in FIG. 4, the transmission pattern bitmap is defined only on the available slots 404 within the RP 400. The length of the transmission pattern is the time domain duration of the pattern. In the example where the time domain transmission bitmap is {01010000}, the length of the pattern is 8 time units. The time-domain transmission pattern bitmap, like the RP bitmap, may also repeat within the RP period. In some embodiments, a UE also listens to other UE's transmissions in the "off" slots defined by the UE's transmission pattern or any slot that is not defined as an "on" slot in the UE's transmission pattern. Alternatively, a UE may listen to other UEs or check other UE's SL control information as long as it is not transmitting in the same slot. In some embodiments, a UE only listens to other UE's transmission within a slot defined in an RP as long as it is not transmitting at the same time.

In some embodiments, the time domain resource configuration defines or directly indicates the time location of an initial transmission of a TB and/or a time gap between the initial transmission of the TB and a repetition of the TB. In some embodiments, the time domain configurations include time domain resource configuration of physical sidelink shared channel (PSSCH) and/or physical sidelink control channel (PSCCH), frequency domain resource configuration of PSSCH and PSCCH, the transmission pattern, repetition related parameters (for example repetition number K, length of the transmission pattern, RV sequence for repetition), code domain resource configuration, waveform configuration, resource configuration for DMRS, etc. The transmission pattern can be part of time-domain and frequency domain resource configuration. Each signaling term may be optional. The time-domain resource configuration may also include mini-slot related information, such as the starting symbol and length, in terms of number of symbols of one transmission, and PSSCH/DMRS mapping type.

The time domain resource configuration may include optionally an RP period, optionally an offset (also referred to as starting slot), transmission pattern bitmap, repetition number (K), RV sequence for repetition, and optionally length of the transmission pattern. If an RP is already configured, then the transmission pattern bitmap can be defined on top of (or overlaid on) RP configuration, as shown in FIG. 4. The configuration can also be done without an RP configuration, as shown in FIGS. 3A and 3B. The meaning of a repetition bitmap with and without an RP configuration should be clear from FIG. 4 (with RP configuration) and FIGS. 3A-3B (without RP configuration), respectively.

The frequency domain resource configuration may include, for example, the active Bandwidth part (BWP) used for SL transmission and subchannels/Resource block group (RBG) of the BWP. There may be two different types used to indicate the frequency domain subchannels. Type 0 may indicate continuous RBs for the resource allocation, which indicates the starting RB (or RBG) location and number of resource blocks (RBs) or number of RBGs. In some embodiments, the starting RB indicated is the starting virtual RB (VRB), for which the actual physical location of RB, known as physical RB (PRB) is derived from VRB and hopping configuration parameters if frequency hopping is configured. Type 1 may indicate which RBGs or subchannels among all the available RBGs or subchannels are active. The number of RBs in each RBG or frequency subchannel and starting RBs of the first RBG/frequency subchannel may be also configured by RRC or system information. Type 1 can be indicated using a RBG or subchannel bitmap, where each bit of the RBG or frequency subchannel bitmap indicates whether the corresponding RBG or frequency subchannel is used or not. There may be an additional flag to indicate whether the frequency resource indication is using type 0, type 1 or is dynamically switching between type 0 and type 1.

In some embodiments, the frequency domain configuration may first indicate the starting RB of the first frequency sub-channel (RB_{start}), number of RBs per frequency subchannel (N_{RBin_subchannel}), and the total number of frequency sub-channels (n_{subchannel}) available for the SL transmission. The above parameters can be used to determine the range and partition of frequency subchannels. For example, in a resource grid as shown in in FIG. 1A, the above parameters (starting RB of F0, number of frequency sub-channels is 4 and the number of RBs per sub-channel is the number of RBs in F0) can define the frequency location and size for F0 to F4. The above parameters can be UE specifically indicated (for example in RRC) or can be broadcast in system information for multiple UEs. The frequency domain configuration may then indicate the index of the frequency subchannel m to be used for the transmission. A UE may then determine that its frequency allocation corresponds to the RB that starts at RB index RB_{start}+m*N_{RB_in_subchannel} and with n_{subchannel} number of continuous RBs to be used. In the case that a transmission pattern bitmap is determined in time domain and different subchannels may be used in frequency domain for different repetitions of the TB, the frequency domain configuration may further indicate the frequency index for each transmission/repetition of the TB. For example, in the case of the example shown in FIG. 1A, F0 to F4 may correspond to index m as 0, 1, 2, 3, respectively, and the frequency domain resource configuration may indicate a frequency channel index sequence corresponding to each transmission of the TB, which is {0, 2}, corresponding to F0 and F2 for first and second transmissions of the TB.

The time and frequency domain resource configuration for the SL control channel PSCCH (or SA) may share the same above configuration for SL data channel or have its own separate configuration. In some embodiments, the resource configuration for an SA shares the parameters above with the data channel configuration, but has the following additional configurations, which may include starting symbol and length of a SA in terms of number of symbols, a time gap between SA and the corresponding data transmissions if SA and data transmission are in different slots (see, for example, FIGS. 11A and 11B described below), and the frequency-domain resource configuration of SA. For example, the frequency domain resource configuration of SA may include a starting frequency domain communication resource and a size of a SA in the frequency domain (for example in terms of resource blocks, the starting RB and the size of SA in number of RBs). There may be a parameter used to indicate whether the SA and data is in frequency division duplex (FDD) mode or time division duplex (TDD) mode and/or whether the SA and data are in different slots.

In some embodiments, SA and the corresponding SL data transmission may be FDDed as in FIGS. 11A and 11B. The starting RB for the SA may share the starting RB configuration for the SL data, which can be derived for example as RB_{start}+m*N_{RB_in_subchannel}. The number of RBs for SA s_{RBin_SA} may be UE specifically configured (for example in RRC), cell specifically configured (for example in system information block) or predefined (for example a fixed number 2). The resources for the SL data transmission may need to exclude the resources used for SA transmission. For example, the SL data transmission in the case of FDD may be starting at RB_{start}+m*N_{RB_in_subchannel}+s_{RB_in_SA} instead of RB_{start}+m*N_{RB_in_subchannel}. In some embodiments, when a UE listens to transmissions from other UEs, the UE may assume that SA may be potentially transmitted by the other UEs in the same frequency location at each frequency sub-channel.

Although some embodiments described herein relate to time-domain and frequency domain resource configuration, in general communication resources could be configured in other domains or with other parameters. The following is a non-limiting list of examples of parameters that may be signaled in resources configured in other communication resource domains.

Code domain
    Layer index, Signature index or codebook index indicating which layers/signatures/codebooks to be used for orthogonal or non-orthogonal multiple access Waveform
    Discrete Fourier transform spread orthogonal frequency division multiplexing (DFT-S-OFDMA);
    Cyclic prefix OFDMA (CP-OFDMA) or whether transformed coding is enabled.

Frequency hopping for PSSCH
    Frequency hopping offset (if frequency hopping is enabled). Frequency hopping offset may indicate the number of RBs or RBGs that are hopped from one slot to its adjacent slot and/or from the first half of a slot to the second half of a slot within the available bandwidth in a BWP.

Reference signal (RS)
    PSSCH/DMRS mapping type. Type A may indicate the DMRS location is at fixed symbols among the slot. Type B may indicate the DMRS symbol location depends on the starting and ending symbol configuration of the data resource.
    DMRS location and symbols. Which may indicate how many DMRS symbols are used and location of DMRS symbols.
    DMRS sequence initialization;
    Antenna port;
    Number of layers;

Note that different transmissions of the TB defined in a transmission pattern may share the same parameters configured in domains other than time domain or different transmissions of the TB may use different resources for the other domains as well. In the first scenario, only one set of resources in the respective domains would be configured. In the latter scenario, a corresponding transmission pattern in each respective domain may be configured for each transmission of the TB. For example, to signal a transmission pattern in FIG. 1A to FIG. 1K, the BS may signal to the UE the frequency location of the transmission pattern for each UE at each transmission of a TB. For example, a BS may signal the partition (for example available bandwidth and number of RBs for each RBG or frequency subchannels) of the frequency sub-channels (F0-F3)) and index of the frequency sub channels used for each transmission/repetition of the TB (only 2 repetitions in FIG. 1A to FIG. 1K). In some other embodiments, the same set of parameters is used for all the transmissions of the TB in other domains. For example, the set of frequency domain location configuration parameters may be used to determine all the frequency domain locations of the transmissions of the same TB (with the possible exception of frequency hopping, which could define a frequency location change at different time locations).

Figure 5:
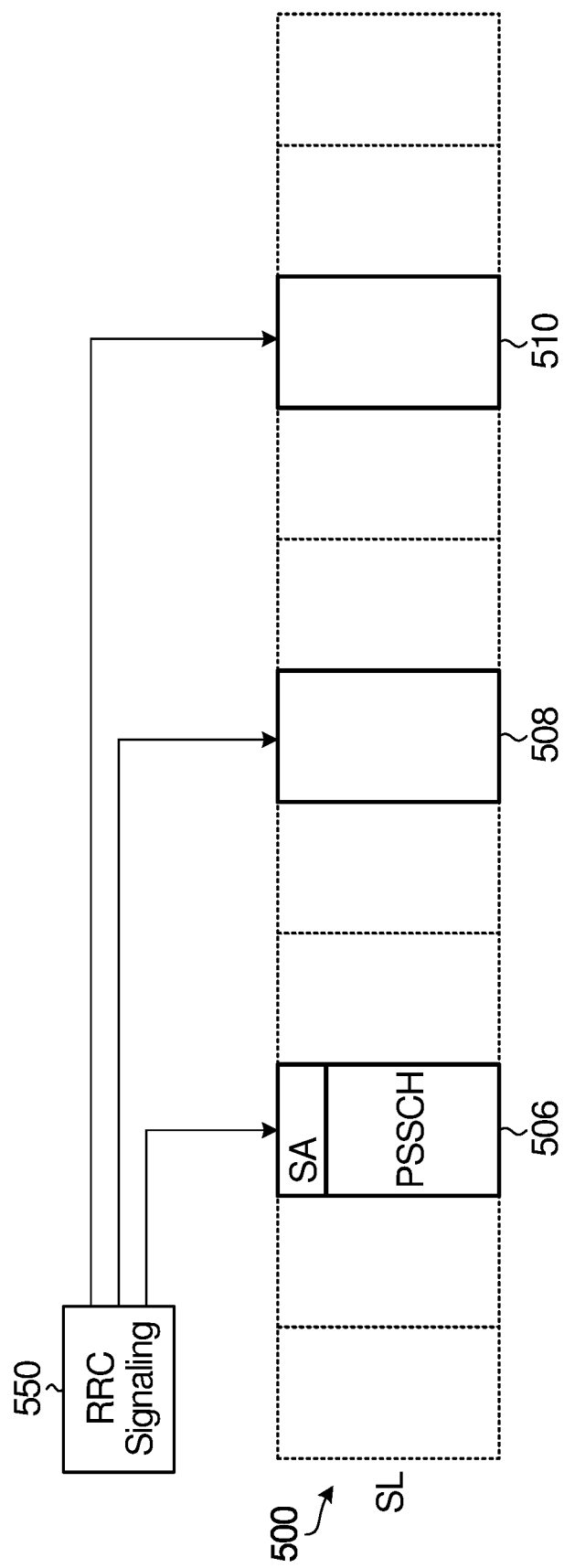
FIG. 5 is a block diagram illustrating an example of an RRC signaled transmission pattern for an SL transmission scheme.

FIG. 5 is a block diagram illustrating an example of an RRC signaled transmission pattern for an SL transmission scheme. FIG. 5 includes an SL channel 500, RRC signaling 550, and communication resources 506, 508, 510.

In FIG. 5, the RRC signaling 550 signals a transmission pattern and/or locations of the communication resources 506, 508, 510. The communication resources 506, 508, 510 may include the resources used for SL control channel (a PSCCH or an SA) and the resources used for SL data transmission (PSSCH).

In embodiments described herein, a BS may broadcast system information to all the UEs in a cell. The system information (for example SIB) may optionally contain some parameters of the resource configuration for SL transmission that is common for all the UEs in the cell. A UE may detect the corresponding SIB to obtain the common resource configuration parameters before the initial access process or before SL transmission takes place. Such configuration by broadcast signaling is not shown in the flow diagrams below. In addition, all the configuration described in this disclosure for RRC signaling may also or instead be configured in a medium access control (MAC) channel element (CE), for example. Other types of signaling are also contemplated.

Figure 6A:
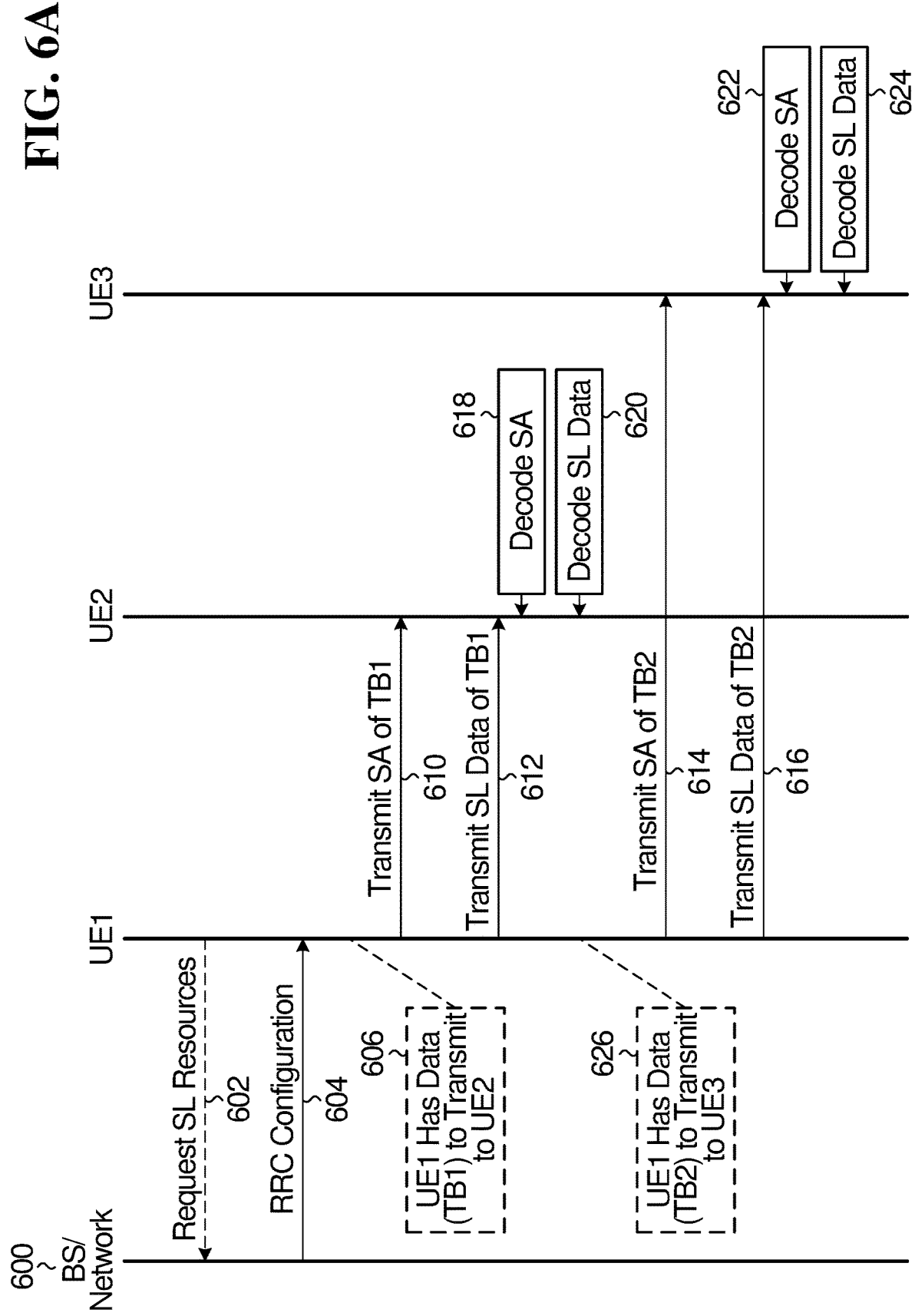
FIG. 6A is a signal flow diagram illustrating an example of a distributed grant-free transmission mode for SL communications.

FIG. 6A is a signal flow diagram illustrating an example of a distributed grant-free transmission mode for SL communications. The embodiment shown in FIG. 6A involves RRC signaling, as generally shown in FIG. 5.

FIG. 6A illustrates a BS or network 600, and three UEs (UE1, UE2 and UE3). The BS or network 600 may be any network entity capable of resource configuration for SL communication, such as a transmit and receive point (TRP). The BS or network 600 is in communication with UE1, and could also be in communication with UE2 and UE3. UE2 and UE3 could be in range of BS or network 600 or out of range of BS or network 600. UE1, UE2, UE3 in FIG. 6A each represent one or more UEs. Any of the UEs UE1, UE2, UE3 could be a group of UEs. For example, if UE2 represents multiple UEs, then the transmission step in 612 is a multicast transmission with multiple destination UEs instead of a unicast transmission with one destination UE. In addition, UE2 and UE3 could be the same or different UE(s).

FIG. 6A includes several transmissions, including an optional request 602 for SL transmission resource configuration, an RRC configuration 604 of resources used for transmissions, transmission 610 of an SA of TB1, transmission 612 of SL data of TB1, transmission 614 of an SA of TB2, and transmission 616 of SL data of TB2.

FIG. 6A illustrates several operations, including SA decoding operations 618 and 622, as well as SL data decoding operations 620 and 624.

The optional transmission at 602 is indicated using a dashed arrow in FIG. 6A. UE1 does not always request SL resources at 602 every time it has data to transmit. In FIG. 6A, an initial request for SL resources may be transmitted from UE1 to the BS or network 600 using request 602. This request may be for new SL resources, or for an update to previously configured SL resources. The request 602 can be part of the initial access process for UE1.

Transmission 604 from the BS or network 600 to UE1, whether in response to a request at 602 or otherwise, could include any of the examples of resource configuration signaling that have been described herein. The RRC signaling at 604 could include transmission pattern parameters such as a transmission pattern bitmap and offset or starting time location, and optionally periodicity of the transmission pattern. The RRC signaling at 604 may also include resource configuration in frequency domain and other domains in some embodiments. The transmission pattern may also define the time location of performing initial transmission and repetitions of a TB. Optionally, a transmission pattern may also be included in the configuration of SL control resources. This control transmission pattern may be the same as or different from the transmission pattern configured for SL data communication resources.

After receiving the RRC configuration at 604, UE1 has obtained all the resource configuration information that it needs to start SL transmissions, without receiving a dynamic grant sent in DCI by the BS or network 600 before each SL transmission. In some embodiments, RRC configuration in 604 might not indicate the configuration of SL control resources or the SL control resource might not be implicit. SL control resources may also be derived from SL data resources. For example, if the SA resource is FDDed with the SL data resource as in FIG. 11A and FIG. 11B and the number of RBs for the SA resource is predefined, then the SA resource may be derived from the configuration of the SL data transmission resources.

As an example of RRC configuration signaling in 604, consider a UE that is to be configured with a transmission pattern shown in FIG. 1B for UE2. The RRC configuration may include the time domain transmission pattern bit map {1 0 1 0 0}, optionally the length of the transmission pattern, which is 5 slots, the repetition number K, which is 2, a RV sequence associate with repetitions of the TB, which is {0 3 0 3} or {0 3} indicating the first transmission uses RV0 and second transmission uses RV3, a starting time location of the transmission pattern or initial transmission, which is the starting time location of T0, and a periodicity of the transmission pattern. The RRC configuration may further include the starting RB of the first frequency subchannel, which is the starting RB of F0, the number of frequency subchannels, which is 4, the number of RBs for each frequency subchannel, which is the frequency size or number of RBs in F0, F1, F2 or F3. The above parameters for defining the range and partition of frequency subchannels may be instead configured in broadcast signaling (for example in SIB). The RRC signaling then may further indicate frequency index of each transmission, which is {1, 3}, indicating F1 and F3 frequency subchannels used for first and second transmission of the TB.

There are various sources of data to be transmitted by UE1, and therefore "data to transmit" blocks 606, 626 are shown in dashed lines in FIG. 6A. For example, data for transmission could be, but need not always be, received by UE1 from the BS or network 600. Data for transmission could arrive at UE1 or be generated internally by UE1.

In transmission 610 from UE1 to UE2, after UE1 has data (TB1) to transmit to UE2 at 606, an SA of a TB1 is transmitted using the RRC configured SL control resources. The SA indicates the resources and parameters used for data transmission. If a transmission pattern is configured for the SL control resources, then the SA of TB1 is transmitted at 610 according to this transmission pattern. UE1 should indicate, in the SA at 610, the transmission parameters and resources that are to be used for data transmission in step 612. The transmission parameters and resources used for SL data transmission in step 612 should be chosen according to the data communication resources configured in RRC configuration in 604.

The SA of TB1 may indicate the transmission pattern for UE1, which is determined according to the transmission pattern in the configuration of SL data communication resources for UE1. The SA of TB1 may include other parameters for the SL transmission in step 612, which may also be derived from the configuration of SL data communication resources for UE1. For example, a time of the initial transmission and the next retransmission in a repetition pattern for SL data transmissions of TB1 could be specified, and then the SL transmissions are performed using the transmission pattern for UE1 defined by the RRC configured SL data communication resources. In another example, the SA may include a time gap between the time location of the SA transmission and the time location of the corresponding transmission of the TB or the initial transmission of the TB, or the start of the transmission pattern. If the SA is associated with one transmission of the TB, then the SA may also indicate which transmission of the TB it is associated with, and the RV associated with that transmission. Examples of transmissions according to transmission patterns are described above with reference to FIGS. 1A to 4. The SA may also include the transmitting UE ID and destination UE ID.

At 618, the SA of TB1 is decoded by UE2, so that UE2 can determine where to find the information with regards to the resources and parameters used for the data transmission at 612, and the SL data of TB1 is then decoded at 620 based on the decoded SA.

FIG. 6 also represents at 626 that UE1 has data (TB2) to send to UE3. The transmission 614 from UE1 to UE3 could be performed before SA and/or data decoding at 618, 620 is complete. This transmission 614 illustrates transmission of an SA associated with TB2, that is performed using the RRC configured SL control resources after UE1 has data to transmit to UE3. This is similar to transmission 610 to UE2. Here TB2 may differ from TB1, and is transmitted in a different period of the transmission pattern that is defined for UE1 by the RRC configured SL data communication resources.

In transmission 616 from UE1 to UE3, an SL data transmission of TB2 is performed using the transmission pattern for UE1 defined by the RRC configured SL data communication resources. This is similar to transmission 612 to UE2. At 622, the SA of TB2 is decoded by UE3, and the SL data of TB2 is decoded at 624 based on the decoded SA.

The data shown at 606 and/or 626 could have been received from the BS or network 600 or another source, or generated by UE1. In the case that data is received by UE1 and intended for UE2 or UE3, transmissions 612, 616 may be retransmissions of that data. As noted above, data for transmission might not necessarily be received by UE1 from another component. The BS or network 600 is only one example source of data that may be transmitted between UEs over a sidelink. Regardless of the data source, SA and SL data transmissions as shown in FIG. 6A are performed when UE1 determines that it has data to send to UE2 and/or UE3.

Figure 6B:
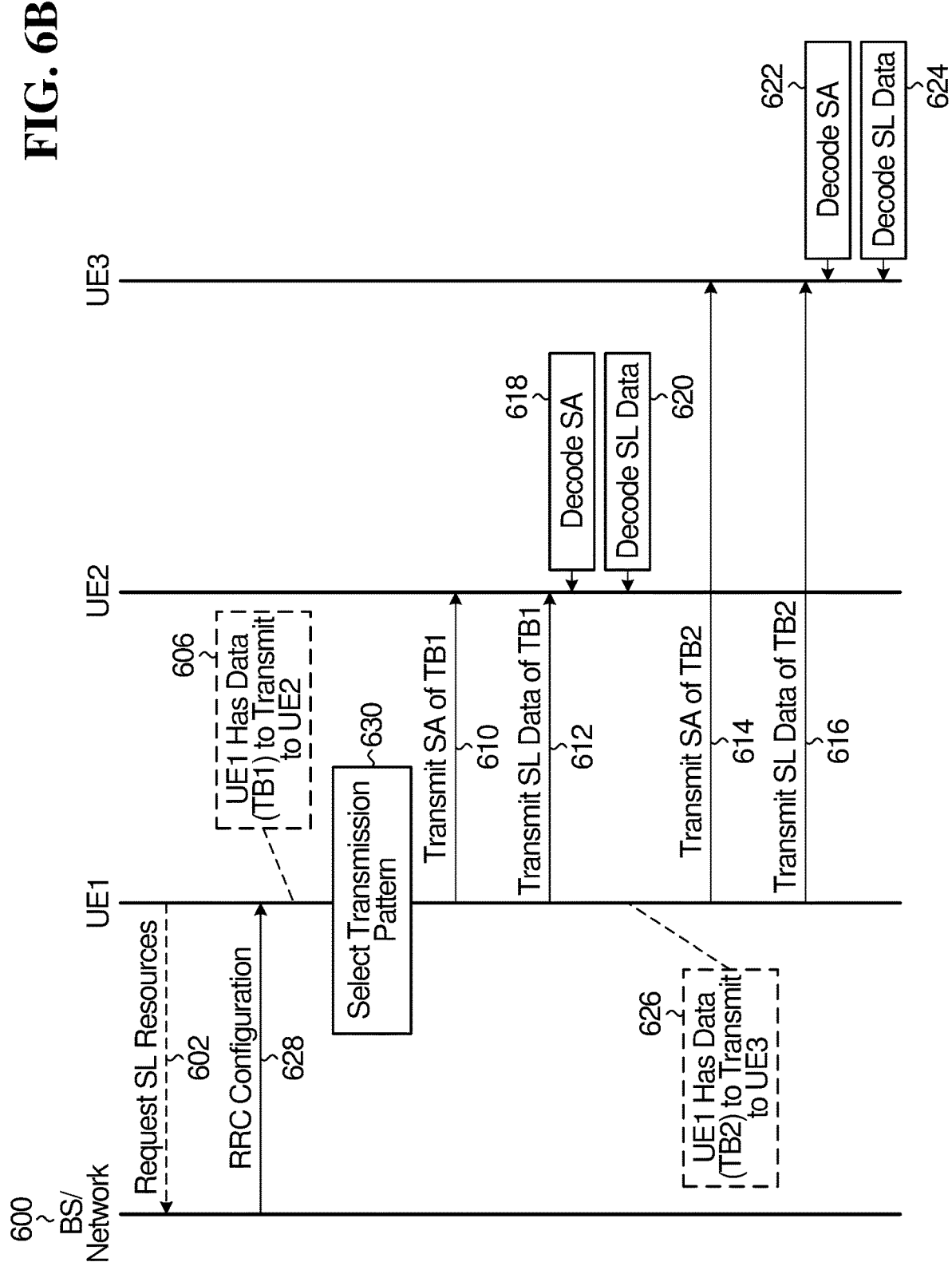
FIG. 6B is another signal flow diagram illustrating an example of a distributed grant-free transmission mode for SL communications

FIG. 6B is another signal flow diagram illustrating an example of a distributed grant-free transmission mode for SL communications, in an example system with a BS or network 600 and UE1 to UE3. In FIG. 6B, at 630 UE1 selects a transmission pattern from a transmission pattern pool. Transmissions 602, 610, 612, 614, 616 correspond to similarly labeled transmissions in FIG. 6A. Similarly, decoding operations 618, 620, 622 and 624 correspond to similarly labeled decoding operations in FIG. 6A. FIG. 6B also includes RRC configuration transmission 628.

In transmission 628 from the BS or network 600 to UE1, RRC signaling configures SL data communication resources and SL control resources. A transmission pattern pool is included in the configuration of SL data communication resources in this example. This is different from transmission 604 of FIG. 6A, where a transmission pattern is optionally included in the configuration of SL data communication resources. In RRC configuration 628, UE1 may also be optionally configured with a starting time location and optionally a periodicity for the transmission patterns for the transmission pattern pool. As also described herein, an example of configuration of a transmission pattern pool in the time domain can include an indication of repetition number and length of the transmission patterns in the transmission pattern pool. The transmission pattern pool may also include information indicating the range and partition of frequency domain subchannels. Optionally, a transmission pattern pool may also be included in the configuration of SL control resources. In some embodiments, SL control resources may also be derived from SL data resources. This transmission pattern pool may be the same as or different from the transmission pattern configured for SL data communication resources. In some other embodiments, transmission pattern pool may be indicated in broadcast signaling (for example in system information block (SIB)).

As an example of RRC configuration signaling for transmission pool in 604, consider a UE that is to be configured with a transmission pattern pool shown in FIG. 1K. The RRC configuration may include optionally the length of the transmission pattern, which is 5 slots, a repetition number K, which is 2, an RV sequence associated with repetitions of the TB, which is {0 3 0 3} or {0 3} indicating the first transmission uses RV0 and second transmission uses RV3, a starting time location of the transmission pattern or initial transmission, which is the starting time location of T0, and a periodicity of the transmission pattern. The RRC configuration may further include the starting RB of the first frequency subchannel, which is the starting RB of F0, the number of frequency subchannels, which is 4, and the number of RBs for each frequency subchannel, which is the frequency size or number of RBs in F0, F1, F2 or F3. In one embodiment, any time domain transmission pattern with 2 transmissions at two different slots within the 5 slots of T0 to T4 in combination with any frequency subchannel among F0, F1, F2 and F3 for each transmission can be a valid transmission pattern to be selected among the transmission pattern pool. In another embodiment, only the transmission pattern corresponding to the resources mapped to UE1 to UE10 as in FIG. 1K are considered a valid transmission pattern to be selected among the transmission pattern pool.

At 630, UE1 selects a transmission pattern for SL data transmission from the transmission pattern pool included in transmission 628. The transmission pattern may be selected autonomously by UE1. In some embodiments, the selection of the transmission pattern among the transmission pattern pool is not completely random. The selection in 630 may be further based on one or more of the combination of the following factors: 1) location, velocity, and direction of the transmitter, distance between vehicles, 2) avoiding occupied resources and avoiding resource collision by selection of a transmission pattern and/or resources by reading other UE's SA resources (to avoid using similar resources) and sensing energy level of one or more earlier transmissions, 3) measurement results such as measurement of reference signal received power (RSRP) of PSSCH, measurement of channel busy ratio (CBR) (such that it is not over a certain limit), etc. Alternatively, UE1 may select the transmission pattern according to a UE index previously assigned to the UE. The transmission pattern selected by UE1 is used in transmissions 612, 616.

In some embodiments, UE1 could select a transmission pattern for SL SA transmissions 610, 614. This selection may be made from the same transmission pattern pool used for SL data transmissions, or from a different transmission pattern pool. The transmission pattern selected for SL control could be the same as or different from the transmission pattern that is selected for SL data transmissions.

Figure 7:
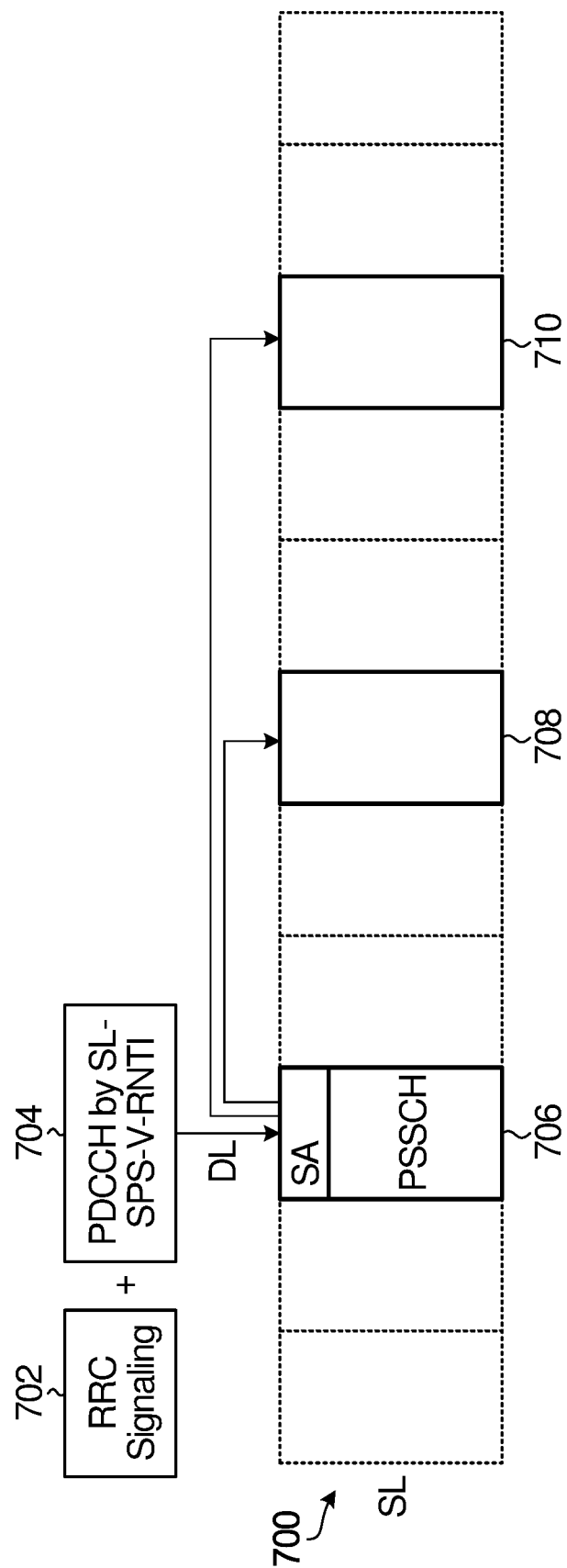
FIG. 7 is a block diagram illustrating an example of a semi-persistent scheduling (SPS) signaled transmission pattern for an SL transmission scheme.

FIG. 7 is a block diagram illustrating an example of a semi-persistent scheduling (SPS) signaled transmission pattern for an SL transmission scheme. FIG. 7 includes an SL channel 700, RRC signaling 702, at 704 a physical downlink control channel (PDCCH) addressed by an SL UE ID, for example SL semi-persistent (SPS) vehicle radio network temporary identifier (V-RNTI) (that is, a DCI sent with CRC scrambled by SPS-V-RNTI), and communication resources 706, 708, 710, which include resources for SA and PSSCH. In FIG. 7, SA and PSSCH are multiplexed (frequency division multiplexed for example) at the same time unit, but they can be located in different time units.

In FIG. 7, the communication resources 706, 708, 710 belonging to the SL channel 700 are signaled by RRC signaling 702 and PDCCH by SL-SPS-V-RNTI 704 through the DL. DCI signaling can be sent to the UE by a BS on PDCCH, with its CRC scrambled by SL-SPS-V-RNTI as shown at 704. In general, the RRC signaling indicates periodicity between adjacent time resources or transmission patterns and the DCI signaling indicates the transmission pattern and/or communication resources for one transmission or multiple transmissions of a TB. The communication resources 706, 708, 710 may be used for an SA (or a PSCCH) and a physical SL shared channel (PSSCH).

Figure 8:
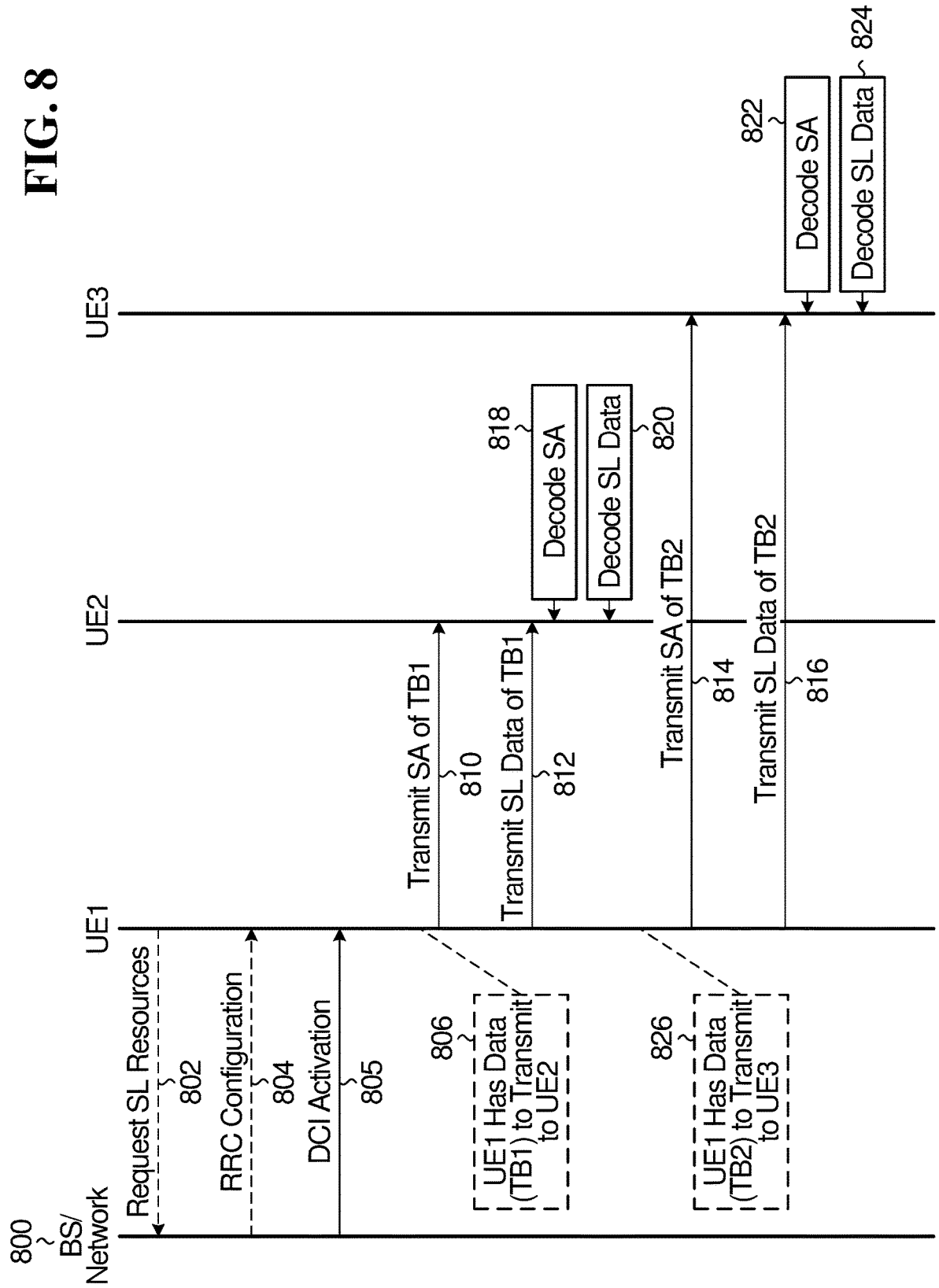
FIG. 8 is a signal flow diagram illustrating an example of SL transmission mode using SPS.

FIG. 8 is a signal flow diagram illustrating an example of SL transmission mode using SPS. FIG. 8, like FIG. 7, involves SPS and DCI signaling. In FIG. 8, scheduling of the transmission pattern for UE1 is semi-persistent. FIG. 8 includes BS or network 800 and UE1 to UE3. Transmissions 802, 810, 812, 814 and 816 correspond to similar transmissions 602, 610, 612, 614 and 616, respectively, in FIG. 6A. Similarly, decoding operations 818, 820, 822, 824 correspond to similar decoding operations 618, 620, 622, 624, respectively, in FIG. 6A. Operations 806 and 826 are similar to operations 606 and 626, respectively, in FIG. 6A. FIG. 8 also illustrates a DCI activation transmission 805, and optional RRC configuration transmission 804.

In optional transmission 804 from the BS or network 800 to UE1, RRC signaling may optionally configure an RP for SL communication. The RRC signaling may also configure part of the resources used for the transmission patterns, for example a periodicity of transmission patterns.

In transmission 805 from the BS or network 800 to UE1, DCI signaling activates a transmission pattern in UE1. This activation could indicate a transmission pattern for UE1. The location of DCI may determine the starting time location of the transmission pattern. The activation DCI may also include transmission parameters and resources used for the transmission of SL data and control in 812 and 810. The transmission pattern may also be defined without RP or in the RP defined through RRC signaling. After the DCI activation, the transmission pattern is assumed to repeat itself periodically with periodicity between two adjacent transmission patterns optionally configured in RRC signaling in 804. In this respect, FIG. 8 may be considered to be a form of SL SPS. After determining the transmission pattern and periodicity, UE1 transmits using transmissions 810, 812, 814, 816 in the same manner as described above in reference to FIG. 6A.

Figure 9:
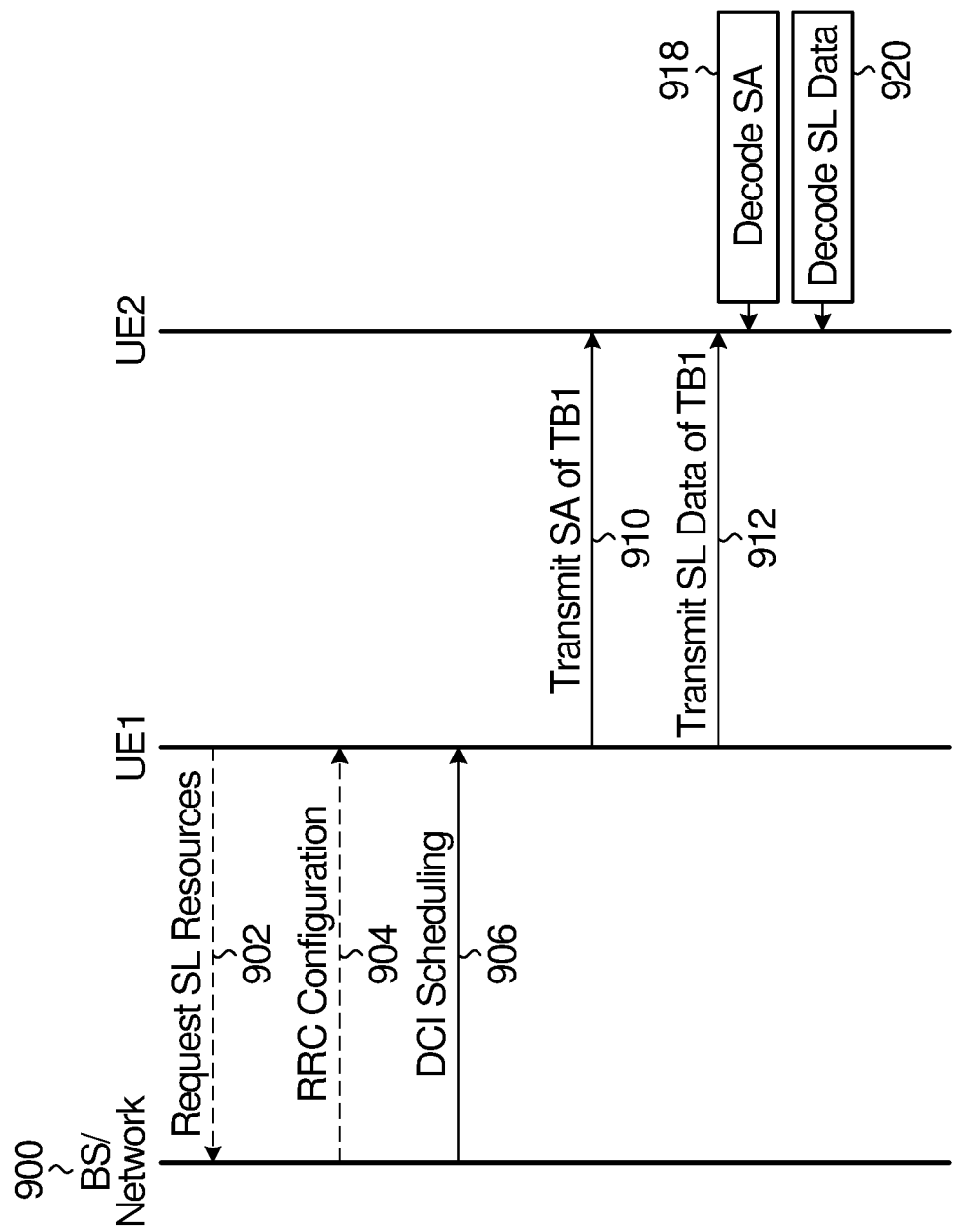
FIG. 9 is a signal flow diagram illustrating an example of an SL scheduled transmission scheme.

Other embodiments could also involve DCI. FIG. 9 is a signal flow diagram illustrating an example of an SL scheduled transmission scheme. In FIG. 9, scheduling of the transmission pattern for UE1 is dynamic. FIG. 9 includes BS or network 900, UE1 and UE2. Transmissions 902, 910 and 912 correspond to similar transmissions 602, 610 and 612, respectively, in FIG. 6A. Similarly, decoding operations 918, 920 correspond to similar decoding operations 618 and 620, respectively, in FIG. 6A. FIG. 9 also includes optional RRC configuration transmission 904, which corresponds to a similar transmission described above with reference to FIG. 8. Transmission 904 may optionally include resource configuration of an RP. Transmission 904 may or may not include a periodicity as referenced in the description of FIG. 8. Additionally, transmission 906 for DCI scheduling is illustrated.

In transmission 906 from the BS or network 900 to UE1, the DCI schedules a dynamic SL transmission pattern for UE1. In the case that RRC configuration has configured an RP for SL communication using transmission 904, the DCI determines a transmission pattern for UE1 from that RP. Alternatively, the DCI includes a transmission pattern without an RP being configured. A repetition pattern or other transmission pattern could be assigned to UE1 for each TB used in transmissions 910 and 912. In this sense, the scheduling is dynamic. The starting location of the transmission pattern may be determined by the time the DCI is received in 906.

Figure 10:
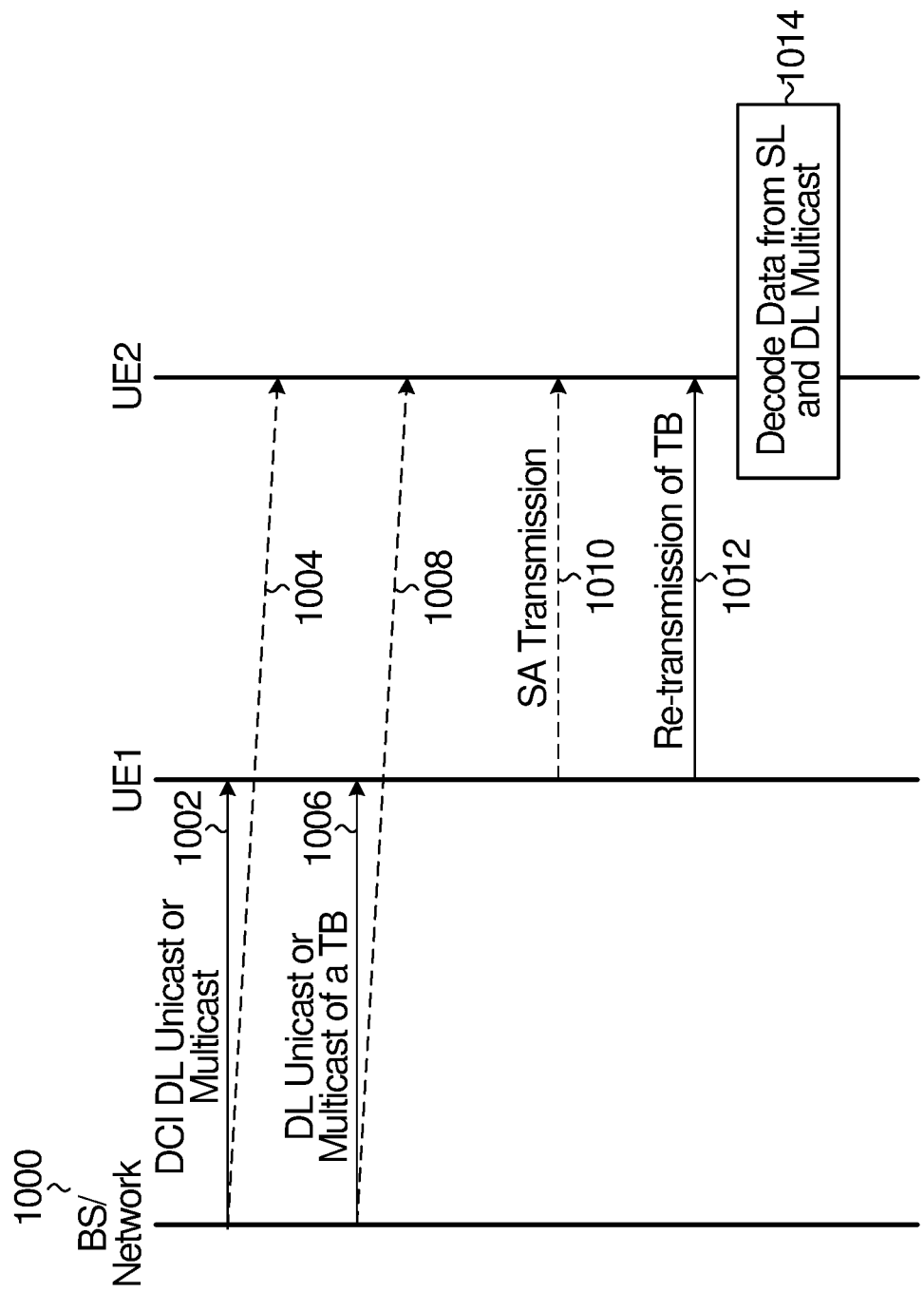
FIG. 10 is a signal flow diagram illustrating an example of a UE cooperation using SL transmission.

FIG. 10 is a signal flow diagram illustrating an example of a UE cooperation using SL transmission. In FIG. 10, BS or network 1000 and UE1, UE2 are illustrated. FIG. 10 includes several transmissions, including DCI signaling 1002/1004 that is used to schedule the DL unicast or multicast data transmission 1006/1008, optional SA transmission 1010, and retransmission of the TB from 1006, at 1012. FIG. 10 also includes decoding at 1014.

In transmission 1002/1004 a DCI used for scheduling DL unicast or multicast transmission is transmitted from the BS or network 1000 to UE1 and UE2. The DCI used for DL unicast or multicast transmission may further include information for SL retransmission resources for UE cooperation. As an example, the DCI in 1002 may include a starting location (for example a starting slot) of a transmission pattern. The DCI could be a group common (GC)-PDCCH.

In transmission 1006/1008 a TB is transmitted from the BS or network 1000 to UE1 and UE2 in multicast transmission, or just UE1 in the case of unicast transmission.

In optional transmission 1010, an SA is transmitted from UE1 to UE2. In some embodiments, it might not be necessary to transmit an SA from UE1 to UE2 and the transmission at 1010 might not be performed.

In transmission 1012, the TB from 1006 is retransmitted from UE1 to UE2. The retransmission in the SL at 1012 may use SL transmission resources configured by UE specific RRC signaling beforehand, or configured by the DCI signaling in 1002 or a combination of RRC signaling and the DCI signaling sent in 1002. For example, a UE may use the resources configured in RRC, which may include a transmission pattern, a starting location (offset) and a periodicity of the transmission pattern. Alternatively, a UE may use the transmission pattern configured by the RRC and use the starting location configured in the DCI signaling in 1002 as shown in FIG. 10. In other embodiments, the transmission pattern is also indicated in the DCI. At 1014, the data is decoded from the SL transmission 1010 and the DL unicast or multicast 1008.

The retransmission in FIG. 10 is an example of UE cooperation, as UE2 might not have been able to properly decode transmission 1008, for example, if UE2 is out of range of the BS or network 1000. However, UE2 could be able to decode the retransmission from UE1 on the SL. Alternatively, UE2 may decode the retransmission 1012 from UE1 and combine the retransmission with the original transmission received from DL transmission 1008. In this sense, UE1 may be considered a CUE, and UE2 may be considered a TUE.

Several embodiments disclosed herein may involve control signaling between UEs. FIGS. 6A, 6B, and 8, for example, illustrate SA transmissions. Different SA configurations are possible.

FIG. 11A is a plot illustrating an example of a configuration of an SA. FIG. 11A illustrates time slots 1100-1106 on a time-frequency resource grid. During four of those time slots 1101, 1103, 1105 and 1106, an SA transmission and an SL data transmission are performed. These transmissions may be performed, for example, in accordance with a transmission pattern.

In FIG. 11A, an SA is associated with each of the four SL transmissions in the time slots 1101, 1103, 1105 and 1106, which correspond to a transmission pattern {0101011} that is used as an example above. Each SA may indicate the transmission pattern and resources used for each SL data transmission of time slots 1101, 1103, 1105 and 1106 (may include both time domain and frequency domain configuration described earlier). An SA may also include the number of transmissions, and the RV sequence associated with the transmissions. Each SA may also indicate the starting location of the transmission pattern or the time location of the transmission associated with this SA. The indication can be actual time location or relative time location to the SA.

In the case of an SA and its associated SL transmission being frequency division duplexed (FDDed) as in FIG. 11A or otherwise combined in the same time unit, the time location of the associated SL transmission may be derived from the time location of the SA.

Additionally, the SAs may indicate other information associated with the transmissions of SL data such as the RV for each SL transmission and/or the RV for its associated transmission. An SA may also indicate the current transmission of the TB and/or RV. For example, the SA in slot 1101 may indicate that this is the first transmission of the TB and it may also indicate the RV that is associated with this TB.

Alternatively, each SA may only include the transmission pattern and resources used for the SL transmission for the associated transmission. For example, the SA transmission associated with time slot 1101 may only include the parameters used for the SL data transmission in that particular time slot 1101.

FIG. 11B is another plot illustrating an example of a configuration of an SA. FIG. 11B illustrates the same time slots as FIG. 11A. However, an SA transmission is performed only in time slot 1101, and is associated with all transmissions in the transmission pattern. Therefore, the SA transmitted during time slot 1101 in FIG. 11B includes the transmission pattern and resources used for each SL data transmission in time slots 1101, 1103, 1105 and 1106, and in some embodiments includes both time domain and frequency domain configuration described earlier.

An SA may also include the number of transmissions for the TB, and the RV sequence associated with the transmissions. The SA may also indicate the starting time location of the transmission pattern or the starting time location of the initial transmission of the TB. In some embodiments, an SA uses its own time location as reference and only includes a time gap between the SA and the corresponding data transmission, which could be initial transmission of a TB, the starting location of the transmission pattern or the data transmission associated with the SA. In the case of the SA and an associated SL transmission being FDDed as in FIG. 11B or otherwise combined in the same time unit, the time location of the associated SL transmissions may be derived from the time location of the SA.

In FIGS. 11A and 11B, the SA and SL data transmissions are separated using frequency division duplex (FDD). In such a scenario, the time locations of an SA may not need to be explicitly configured by the BS in the example SL transmission modes described herein, as the time location of an SA can be derived from the time location of its associated SL data transmission/transmissions. However, in general, the SA and SL data transmissions may be separated using other configurations, such time division duplex (TDD). In the case of TDD, an SA may include a time gap between the time location of the SA and the time location of its associated SL data transmission (in a configuration of FIG. 11A) or the SA may include a time gap between the time location of SA and the time location of the initial SL data transmission or the transmission pattern of its associated data transmissions of the TB (in a configuration of FIG. 11B). Similarly, in the case of TDD, when configuring the SA resource, the BS may indicate a similar time gap between SA and its associated data transmission such that a UE can derive the time resource used for SA given the time resource configured for the data transmission.

For the SA in the configurations of FIGS. 11A and 11B or an SA in general, the SA may indicate the time and frequency resources used for each SL transmission of the TB.

An SA may indicate the actual frequency location of each transmission. In one embodiment, SA may indicate the starting VRB or PRB and the size of frequency resources. Each transmission of the TB may share the same frequency resource parameters. In the case of configuration based on VRB, the actual PRB may be derived based on frequency hopping configuration for each transmission. In another embodiment, an SA may indicate an index sequence of frequency subchannels used for each transmission, similar to the RRC configuration of frequency domain resources.

An SA may further indicate the range and partition of the frequency subchannels similar to the RRC configuration of frequency domain resources, which may include the starting RB of the first frequency subchannel, the number of frequency subchannels, the number of RBs for each frequency subchannel. Alternatively, the range and partition of the frequency subchannels may be configured in system information and common for all UEs. Alternatively, the range and partition of the frequency subchannels may be configured in RRC signaling for the receiving UE, where the same frequency subchannel partition can be applicable to the transmitting UE.

Similarly, an SA may indicate the time location of each transmission by sending the time domain transmission pattern bitmap. Alternatively or additionally, an SA may send the time location of an initial transmission and/or a time gap between initial transmission and a repetition of the TB. The time location can be the actual time location or the time location relative to the time location of SA transmission.

Distributed grant-free SL communication as described herein could be applied to group based configurations. Groups may include one or more CUEs and one or more TUEs. The process of group based configuration may be performed as described below.

Before SL transmission, a discovery phase may be used to form the cooperation group. In a discovery phase, all potential CUEs and TUEs in a group may be signaled a group ID, for example, a group RNTI.

In a broadcast/multicast phase, a BS may schedule a DL multicast using a group common (GC)-PDCCH (that is, a GC-DCI) with cyclic redundancy check (CRC) scrambled by the group RNTI. The GC-PDCCH may also indicate the starting time unit (for example a slot) for a cooperation phase. Alternatively, if the transmission is to start from a leader UE (LUE), then the LUE may send a scheduling assignment (SA) along with an SL data transmission in the SL unicast or multicast phase. The SA may indicate the starting time unit (for example a slot) for a cooperation phase.

In a cooperation phase, the CUEs retransmit the data that is received in the DL/SL broadcast/multicast and send to the TUE. The CUEs use the starting time location (for example a starting slot) of the initial transmission or the transmission pattern, a transmission pattern and other resource configuration parameters associated with the UE for the SL transmission in the cooperation phase. The UE specific transmission pattern and other resource configuration parameters may be configured in RRC signaling as described in this disclosure or associated with a UE index among the group as described in the next paragraph. Alternatively and/or additionally, the SL transmission resource for SL data transmission in the cooperation phase may also be configured or partially configured by the DCI sent by the BS or SA sent by the LUE in the multicast/broadcast phase. For example, a CUE can use the starting time location indicated in the multicast/broadcast phase along with its transmission pattern configured by RRC to determine its transmission resources for the cooperation phase. The CUE may also send an SA along with the data transmission to indicate the transmission resource for the transmission in the cooperation phase. The SA can be associated with or contain the information of the group RNTI.

Alternatively, the UE may be provided with a UE index among the group, which is associated with communication resources (for example, time domain transmission pattern, RV sequence, frequency-domain resources, DMRS resources). The UE index may be configured by RRC signaling along with the group-RNTI. The UE index may be assigned in the discovery phase of forming the UE cooperation group. A UE may be configured with a transmission pattern pool. The transmission pattern pool may be configured or predefined to be common for all the UEs in the same cooperation group. Alternatively, the transmission pattern pool can be UE specifically configured. The transmission pattern pool may be configured beforehand for the group, for example in the discovery phase. Alternatively, the transmission pattern pool may be indicated during the broadcast/multicast phase in the DCI or SL control channel. For example, a BS or network could indicate a repetition number and length of transmission pattern in the GC-PDCCH used in the broadcast phase, which defines the transmission pattern pool as described earlier in this disclosure. The transmission pattern can also be predefined without signaling. During the cooperation phase, the UE maps the UE index to a transmission pattern pool to determine its transmission pattern.

FIGS. 1K and 2 provide examples of a transmission pattern pool, as well as mapping of UE indices to transmission patterns within the transmission pattern pool.

In some embodiments, in the cooperation phase, every CUE may be forwarding the same packets to all other UEs. If different UEs are sending the same packets over the same frequency-domain resources, a receiving UE can combine the different signals to decode the packets together. The UEs may also use the whole bandwidth for joint transmission using the same RV (for example as shown in FIG. 2, where each vertical partition is assumed to occupy the whole bandwidth while only the time domain pattern is shown in FIG. 2) or orthogonal resources for different RVs.

Figure 12:
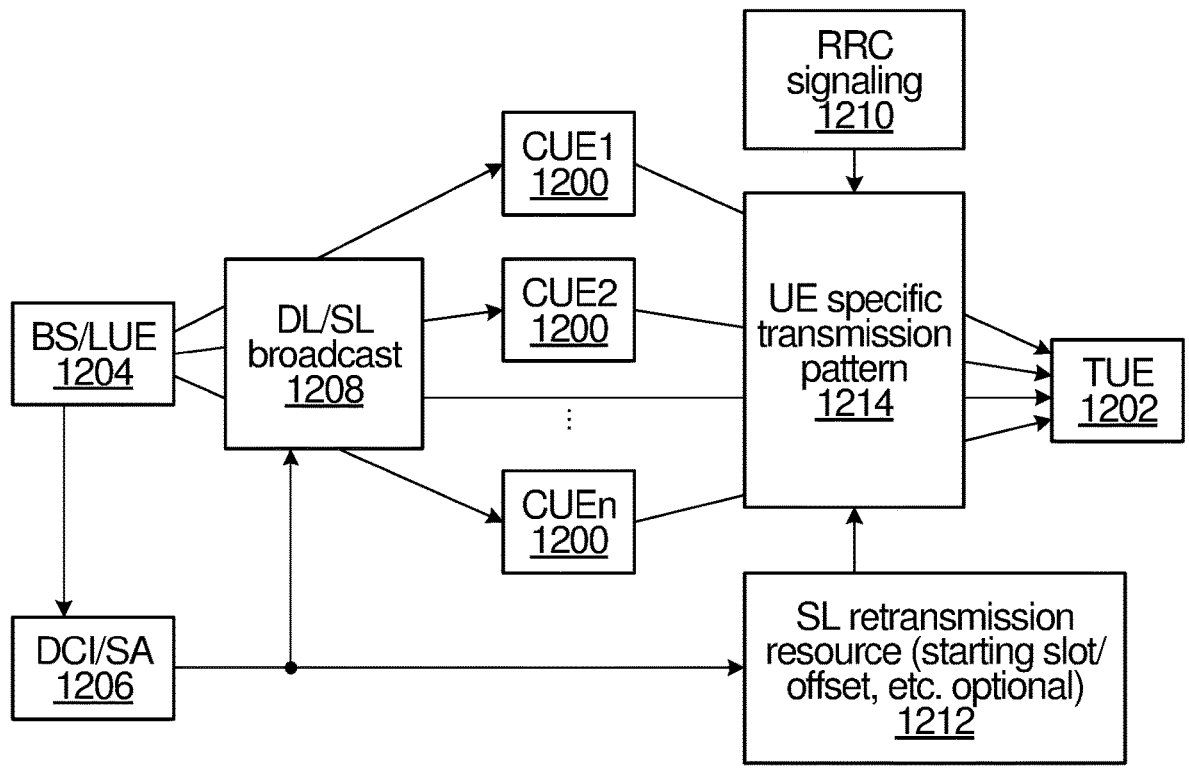
FIG. 12 is a block diagram illustrating an example of a group based configuration for distributed grant-free SL transmission in a network.

FIG. 12 is a block diagram illustrating an example of a group based configuration for distributed grant-free SL transmission in a network. FIG. 12 includes multiple CUEs 1200, identified as CUE1 to CUEn, and one TUE 1202. FIG. 12 also includes a BS or leader UE (LUE) 1204. In the case that the transmission starts with the BS 1204, a DCI 1206 and a DL broadcast 1208 are transmitted. In the case that the transmission starts with the LUE 1204, an SA 1206 and an SL broadcast 1208 are transmitted. FIG. 12 further illustrates RRC signaling 1210, an SL retransmission resource 1212, and a UE specific transmission pattern 1214.

If the transmission starts at a BS at 1204, then the BS sends the DCI 1206, which is used for scheduling a DL broadcast transmitted from the BS 1204 to CUEs 1200. The BS then transmits a DL broadcast 1208 of a data block to CUEs 1200.

Alternatively, if the transmission starts at an LUE at 1204, the LUE sends an SA 1206, which is used for scheduling an SL broadcast transmitted from the LUE 1204 to CUEs 1200. The LUE then transmits an SL broadcast 1208 of a data block.

The RRC signaling 1210 configures the UE specific transmission pattern 1214 to each of the CUEs 1200. A CUE 1200 may optionally indicate its transmission pattern in the cooperation phase to the TUE 1202 in an SA transmission.

As described in FIG. 12, the DCI 1206 may indicate SL retransmission resources for UE cooperation. As an example, the DCI in 1206 may include a starting location (for example a starting slot) of the transmission pattern 1214.

After receiving the UE specific transmission pattern 1214, and possibly the SL retransmission resource 1212, the CUEs 1200 may optionally inform the TUE 1202 of the transmission pattern 1214 using an SA. The CUEs 1200 may then retransmit the received data block from the DL/SL broadcast 1208 to the TUE 1202 using the communication resource slots included in the transmission pattern and possibly the SL retransmission resource 1212. For example, the CUEs 1200 may use the starting time location or starting slot indicated in the DCI/SA in 1206 together with the transmission pattern configured in RRC signaling to determine the resources used to retransmit the data block received from the BS/LUE 1204 in the DL/SL multicast. Alternatively, the CUEs 1200 may use the transmission pattern and starting time slot that are configured in RRC signaling 1210 for the SL retransmission of the data block.

In other embodiments, RRC signaling (UE specific or cell specific) or SIB signaling configures or predefines a transmission pattern pool, and a UE randomly selects a transmission pattern from within the transmission pattern pool. A common transmission pattern pool can be defined for RRC_idle and RRC_inactive UEs, for example.

In some embodiments, the RRC or SIB signaling configures the length of the transmission pattern and the repetition number (K) of the pattern. A UE randomly selects one of the transmission patterns among all the possible patterns of the transmission pattern pool.

For some configurations, a UE could randomly select a frequency subchannel among all predefined frequency subchannels. A UE could further randomly select a signature, codebook or layer among all codebooks for NOMA transmission, for example.

For some other configurations, a UE could randomly select a transmission pattern among a transmission pattern pool which includes a combination of resources in different dimensions. As described above, a combination of two or more of time-domain, frequency-domain, DMRS, layer and other resources could be configured together using a single UE index.

In the case of group based configuration, if there is a mapping between UE index and a combination of communication resources as described above, a UE may be able to randomly select a UE index which maps to one of the communication resource combinations.

Various features of distributed GF SL communications are described above. Method embodiments will now be described in more detail.

Figure 13A:
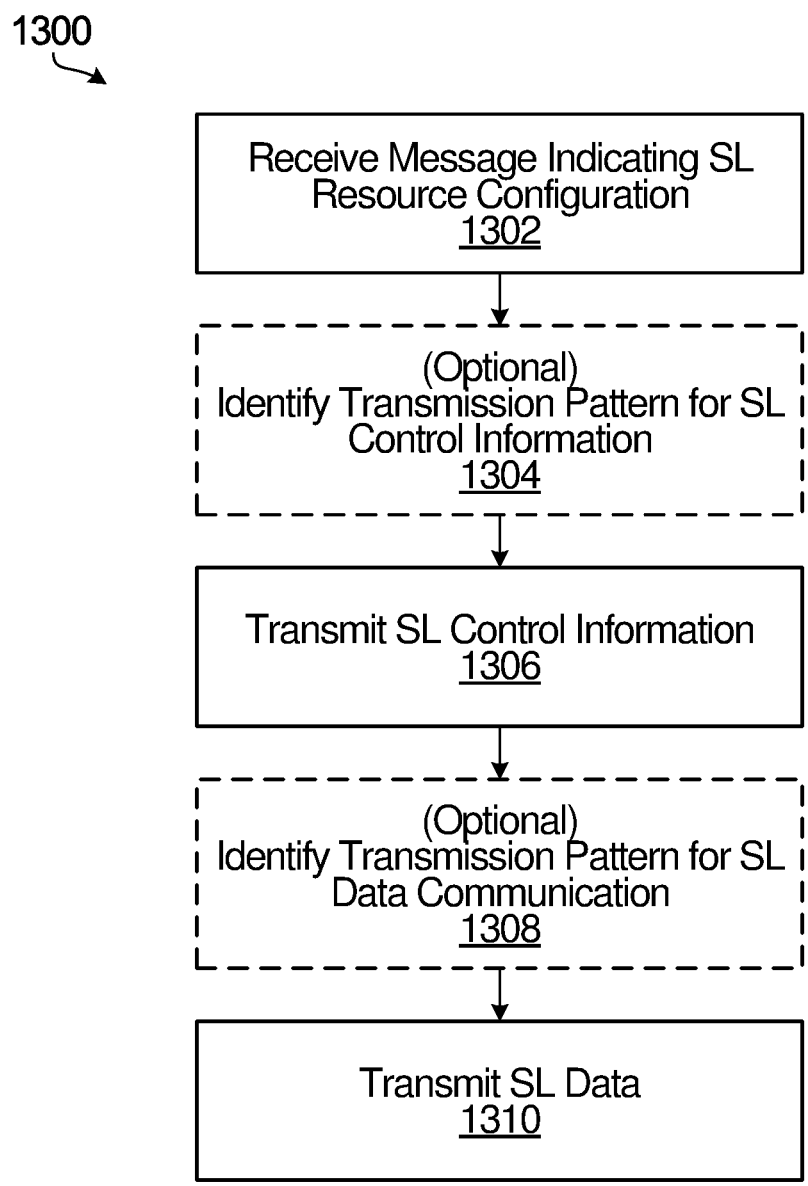
FIG. 13A is a flow diagram illustrating an example of a method for sidelink communications.

FIG. 13A is a flow diagram illustrating an example of a method 1300 for sidelink communications. The example method 1300 is illustrative of a method performed by a user equipment (UE), and involves receiving at 1302, by the UE, a message indicating a sidelink (SL) communication resource configuration. The configuration indicated in the message is to be used by the UE for communicating SL control information and SL data between the UE and another UE. The SL data could be communicated between the UE and multiple other UEs.

In some embodiments, the configuration includes one or more transmission patterns. For example, the SL communication resource configuration could define a transmission pattern pool that includes multiple transmission patterns. The transmission patterns could define how communication resources are to be used for SL control, SL data transmissions, or both. In some embodiments, a transmission pattern defines a pattern of time resources, frequency resources, or time and frequency resources for the SL data or the SL control data.

The SL communication resource configuration could define a transmission pattern for transmitting SL control information. Optionally, a method could include identifying, at 1304, a transmission pattern for SL control information from a transmission pattern pool. This could involve the UE selecting the transmission pattern from the pool, for example. The transmission pattern and/or pool for transmitting the SL control information could be the same as or different from a transmission pattern and/or pool for transmitting the SL data communication.

The example method 1300 also involves transmitting at 1306, by the UE, SL control information according to the SL communication resource configuration. This SL control information could be transmitted to one UE or to multiple UEs. The SL control information may indicate the repetition pattern defined by the SL communication resource configuration. The transmitting at 1306 could also be performed in accordance with a transmission pattern for the SL control information, if configured. In some embodiments, the SL control information is known as a scheduling assignment (SA). The SL control information may be transmitted to another UE using a communication resource defined in the SL communication resource configuration, and the SL control information indicates communication resources used for transmitting the SL data. In further embodiments, the transmitting at 1306 also includes transmitting one instance of the SL control information for both the initial transmission of the data block and the repetition of the data block. For example, as illustrated in FIG. 11B, a single SA could be transmitted for the initial transmission of the data block and the repetition of the data block. The transmitting at 1306 could also include transmitting a separate instance of the SL control information for each of the initial transmission of the data block and the repetition of the data block. This is illustrated in FIG. 11A, for example.

As noted above, in some embodiments the SL communication resource configuration includes a transmission pattern that defines a pattern for transmitting the SL data. The transmission pattern could define an initial transmission of a data block and a repetition of the data block. The transmission pattern could further define time resources used for the initial transmission of the data block and the repetition of the data block. The SL communication resource configuration could further include a starting time of the transmission pattern, and the transmission pattern further defines a time gap from the initial transmission of the data block to the repetition of the data block.

The communication resource configuration could include a transmission pattern pool that includes multiple transmission patterns. As shown at 1308, a method 1300 could include identifying the transmission pattern for transmitting SL data, from such a transmission pattern pool.

For example, the UE could belong to a UE group and the transmission pattern pool could include a transmission pattern pool configured for the UE group. In these embodiments, the UE could identify a transmission pattern from among the transmission patterns of the transmission pattern pool for the UE group. Identifying the transmission pattern could include identifying the transmission pattern based on a UE index of the UE, and a method could then involve receiving additional signaling assigning the UE index to the UE for example. Such additional signaling could include downlink control information (DCI) signaling.

Identifying the transmission pattern at 1308 could involve the UE selecting the transmission pattern. The transmission pattern selection by the UE could be random. Other selection embodiments are also disclosed herein.

FIG. 13A illustrates optional transmission pattern identifications at 1304, 1308. In some embodiments, one or more other UEs use different transmission patterns.

The example method 1300 also involves transmitting at 1310, by the UE, SL data according to the SL communication resource configuration This SL data could be transmitted to one UE or to multiple UEs. In some embodiments, transmission of the SL data includes a retransmission of the SL data.

In the example method 1300, the SL control information and the SL data are transmitted by the UE, at 1304 and 1310, respectively, without the UE receiving, in a downlink control information (DCI), a grant of communication resources.

The example illustrated in FIG. 13A is represents one possible embodiment. However, other embodiments are also possible which could include additional features, fewer features, and/or different features than those illustrated in FIG. 13A.

For example, FIG. 13A illustrates transmitting SL data at 1310. In some embodiments, a UE listens for SL transmissions by other UEs during segments of a transmission pattern during which it is not performing SL transmissions.

In further embodiments, the SL communication resource configuration defines communication resources used for transmitting the SL control information or the SL data. The communication resources could include at least one of time-domain resources, frequency-domain resources and code-domain resources.

The present disclosure also provides various options for performing the illustrated operations. The message received at 1302, indicating the SL communication resource configuration, could be a radio resource control (RRC) message. Another possible option would be a Medium Access Control layer Control Element (MAC CE) message.

Examples of an SL communication resource configuration are provided elsewhere herein, and could include any one or more of: a starting time of a transmission pattern, a periodicity of the transmission pattern, an offset of the starting time, a bitmap representation of the transmission pattern, a length of the transmission pattern, frequency sub-channels of the transmission pattern, a number of repetitions, redundancy version sequence for the repetitions, and a reference signal configuration.

Figure 13B:
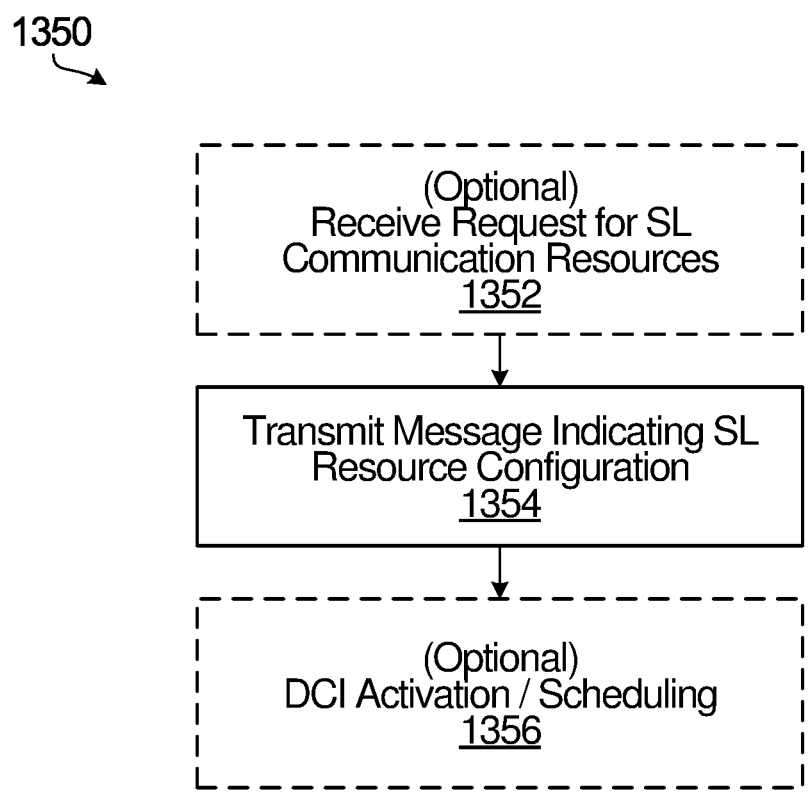
FIG. 13B is a flow diagram illustrating another example method.

FIG. 13B is a flow diagram illustrating another example method 1350, which is illustrative of a method performed by network equipment such as a base station.

In some embodiments, the example method 1352 involves receiving at 1352, by the base station, a request from a UE for SL communication resources. This is shown by way of example in FIGS. 6A, 6B, 8, and 9, but is optional.

At 1354, FIG. 13B illustrates transmitting, by the base station to a first UE, a message indicating an SL communication resource configuration to be used by the first UE for communicating SL control information and SL data between the UE and a second UE. The SL control information and the SL data are transmitted by the first UE without the base station transmitting, in a DCI, a grant of communication resources to the first UE. The SL data could be communicated between the first UE and multiple other UEs, not only the second UE.

In some embodiments, the configuration includes one or more transmission patterns. For example, the SL communication resource configuration could define a transmission pattern pool that includes multiple transmission patterns. The transmission patterns could define how communication resources are to be used for SL control, SL data transmissions, or both. In some embodiments, a transmission pattern defines a pattern of time resources, frequency resources, or time and frequency resources for transmitting the SL data or the SL control data.

The SL communication resource configuration could define a transmission pattern for transmitting SL control information. The transmission pattern and/or pool for transmitting the SL control information could be the same as or different from a transmission pattern and/or pool for transmitting the SL data communication.

In some embodiments, the SL communication resource configuration defines a repetition pattern.

As noted above, in some embodiments the SL communication resource configuration includes a transmission pattern that defines a pattern for transmitting the SL data. The transmission pattern could define an initial transmission of a data block and a repetition of the data block. The transmission pattern could further define time resources used for the initial transmission of the data block and the repetition of the data block. The SL communication resource configuration could further include a starting time of the transmission pattern, and the transmission pattern further defines a time gap from the initial transmission of the data block to the repetition of the data block.

In embodiments that involve a transmission pattern pool that includes multiple transmission patterns, the first UE selects or otherwise identifies the transmission pattern for transmitting SL data, from the transmission pattern pool. For example, the first UE could belong to a UE group and the transmission pattern pool could include a transmission pattern pool configured for the UE group. In these embodiments, the first UE could identify a transmission pattern from among the transmission patterns of the transmission pattern pool for the UE group. Identifying the transmission pattern could include identifying the transmission pattern based on a UE index of the first UE, and this could involve receiving additional signaling assigning the UE index to the first UE for example. Such additional signaling could include DCI signaling, and an example of DCI activation or scheduling is shown in FIG. 13B at 1356. DCI activation is also shown at 805 in FIG. 8, and DCI scheduling is also shown at 906 in FIG. 9.

The example illustrated in FIG. 13B is represents one possible embodiment. However, other embodiments are also possible and could include additional features, fewer features, and/or different features than those illustrated in FIG. 13B.

For example, the description of FIG. 13B above refers to a base station transmitting a message to a first UE. In other embodiments, network equipment transmits messages to multiple UEs that use different transmission patterns.

In further embodiments, the SL communication resource configuration defines communication resources used for transmitting the SL control information or the SL data. The communication resources could include at least one of time-domain resources, frequency-domain resources and code-domain resources.

The present disclosure also provides various options for performing the illustrated operations. The message transmitted at 1354, indicating the SL communication resource configuration, could be an RRC message. Another possible option would be a MAC CE message.

Examples of an SL communication resource configuration are provided elsewhere herein, and could include any one or more of: a starting time of a transmission pattern, a periodicity of the transmission pattern, an offset of the starting time, a bitmap representation of the transmission pattern, a length of the transmission pattern, frequency sub-channels of the transmission pattern, a number of repetitions, redundancy version sequence for the repetitions, and a reference signal configuration.

Embodiments are not in any way restricted to methods. System and device embodiments are also contemplated.

Figure 14:
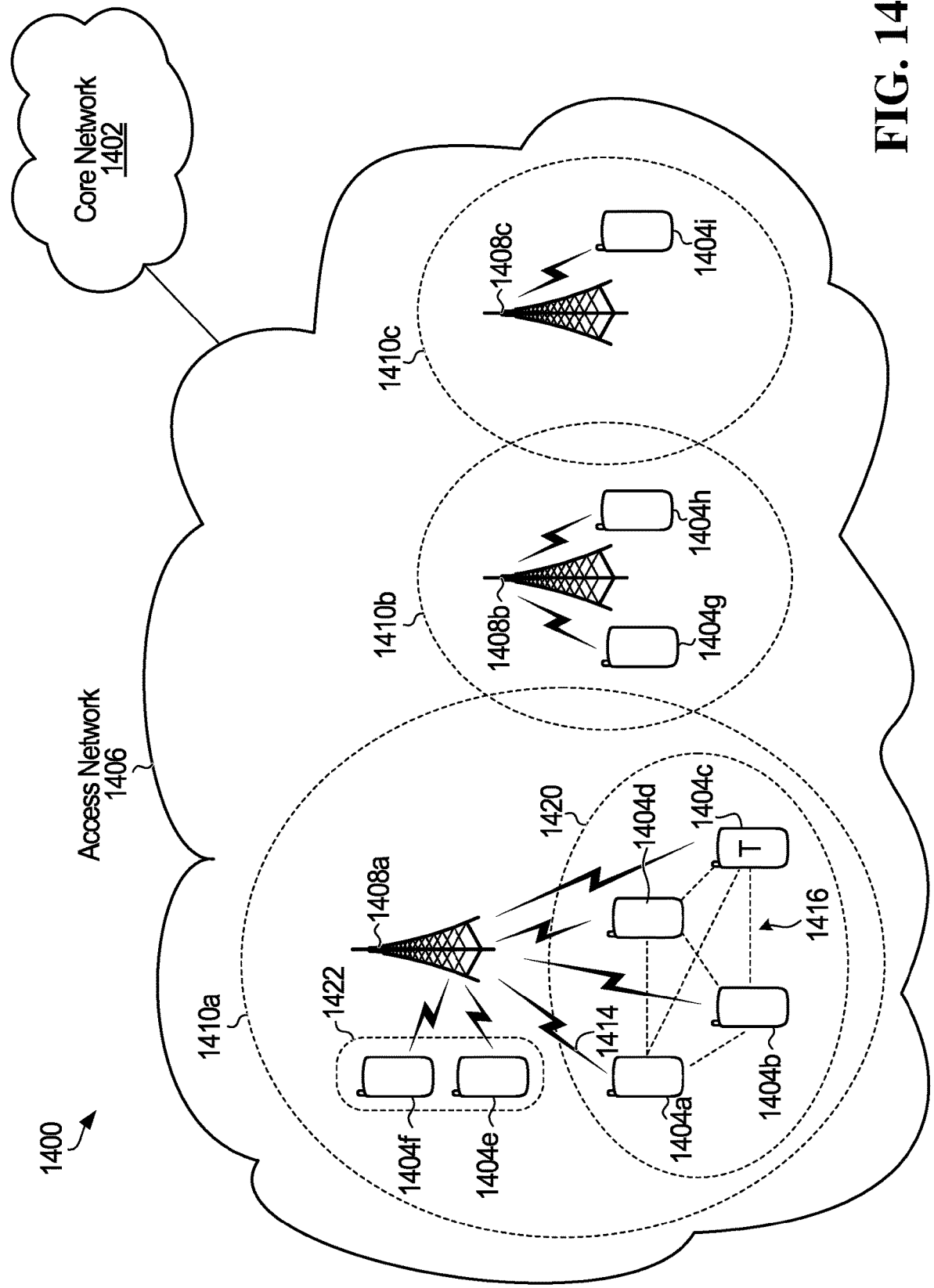
FIG. 14 is a block diagram illustrating an example of a telecommunications network according to one embodiment.

FIG. 14 is a block diagram illustrating an example of a telecommunications network 1400 according to one embodiment. The telecommunications network 1400 includes a core network 1402 and an access network 1406. The access network 1406 serves a plurality of UEs 1404*a*, 1404*b*, 1404*c*, 1404*d*, 1404*e*, 1404*f*, 1404*g*, 1404*h*, and 1404*i*. The access network 1406 could be an Evolved Universal Terrestrial Access (E-UTRA) network. As another example, the access network 1406 could be a cloud access network (C-RAN). The access network 1406 includes a plurality of BSs 1408*a*, 1408*b*, and 1408*c*. The BSs 1408*a-c* each provide a respective wireless coverage area 1410*a*, 1410*b*, and 1410*c*, also referred to herein as a cell. Each of the BSs 1408*a-c* could be implemented using a radio transceiver, one or more antennas, and associated processing circuitry, such as antenna radio frequency (RF) circuitry, analog-to-digital/digital-to-analog converters, etc.

Although not illustrated, the BSs 1408*a-c* are each connected to the core network 1402, either directly or through one or more central processing hubs, such as servers. The BSs 1408*a-c* could serve as a gateway between the wireline and wireless portion of the access network 1406.

Each one of BSs 1408*a-c* may instead be referred to as a base transceiver station, a radio BS, a network node, a transmit node, a transmit point, a Node B, an eNode B, or a remote radio head (RRH), or otherwise, depending upon the implementation.

In operation, the plurality of UEs 1404*a-i* access the telecommunications network 1400 using the access network 1406 by wirelessly communicating with one or more of the BSs 1408*a-c*.

UEs 1404*a-d* are in close proximity to each other. Although the UEs 1404*a-d* can each wirelessly communicate with the BS 1408*a*, they can also directly communicate with each other, as represented at 1416. The communications represented at 1416 are direct communications between UEs that do not go through an access network component, such as a BS. As shown in FIG. 14, UE to UE communications 1416 are directly between the UEs 1404*a-d* and are not routed through the BS 1408*a*, or any other part of the access network 1406. Communications 1416 may also be referred to as lateral communications. In embodiments disclosed herein, UE to UE communications use an SL channel and an SL air interface. On the other hand, a communication between an access network component, such as BS 1408*a*, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), and WiFi.

By using the SL communications 1416, the UEs 1404*a-d* may be able to assist with wireless communications between the UEs 1404*a-d* and the BS 1408*a*. As one example, if UE 1404*c* fails to correctly decode a packet received from the BS 1408*a* but UE 1404*d* is able to receive and correctly decode the packet from the BS 1408*a*, then UE 1404*d* could directly transmit the decoded packet to UE 1404*c* using SL communications 1416. As another example, if UE 1404*c* moves out of wireless coverage area 1410*c*, such that UE 1404*c* can no longer wirelessly communicate with the BS 1408*a*, then UE 1404*b* could forward messages between the UE 1404*c* and the BS 1408*a*. As another example, UE 1404*a* and UE 1404*c* could both receive a signal transmitted from the BS 1408*a* that carries a packet meant for UE 1404*c*. UE 1404*a* may then transmit to UE 1404*c*, via SL communications 1416, the signal as received by UE 1404*a*. UE 1404*c* may then use the information received from UE 1404*a* to help decode the packet from the BS 1408*a*. In these examples, capacity and/or coverage may be enhanced through the assistance of UEs 1404*a*, 1404*b*, and/or 1404*d*. V2X communications as referenced herein are an example of SL communications.

The UEs 1404*a-d* form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group; that is, address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408*a*, then that particular UE is referred to as the target UE. In the examples above, UE 1404*c* is being assisted and so is the TUE 1404*c*. The other UEs 1404*a*, 1404*b*, and 1404*d* in the group 1420 form a cooperation candidate set, which is a set of UEs that may cooperate to help the TUE 1404*c*. The subset of UEs in the cooperation candidate set that actually assist the target UE 1404*c* form a cooperation active set. The cooperation active set may be dynamically selected to assist the target UE 1404*c*. The UEs in the cooperation active set are referred to as cooperating UEs (CUEs).

In UE group 1420, UEs 1404*a*, 1404*b*, and 1404*d* form the cooperation candidate set. If UEs 1404*a* and 1404*b* actually assist target UE 1404*c*, then UEs 1404*a* and 1404*b* form the cooperation active set and are the CUEs. As UEs 1404*a-d* move around, some may leave the UE group 1420 and/or other UEs may join the UE group 1420. Therefore, the cooperation candidate set may change over time. For example, the cooperation candidate set may change semi-statically. The UE group 1420 may also be terminated by the network 1406, for example, if the network determines that there is no longer a need or opportunity for the UE group 1420 to provide assistance in wireless communication between the BS 908*a* and members of the UE group 1420.

There may be more than one UE group. For example, UEs 1404*e* and 1404*f* in FIG. 14 form another UE group 1422.

Figure 15:
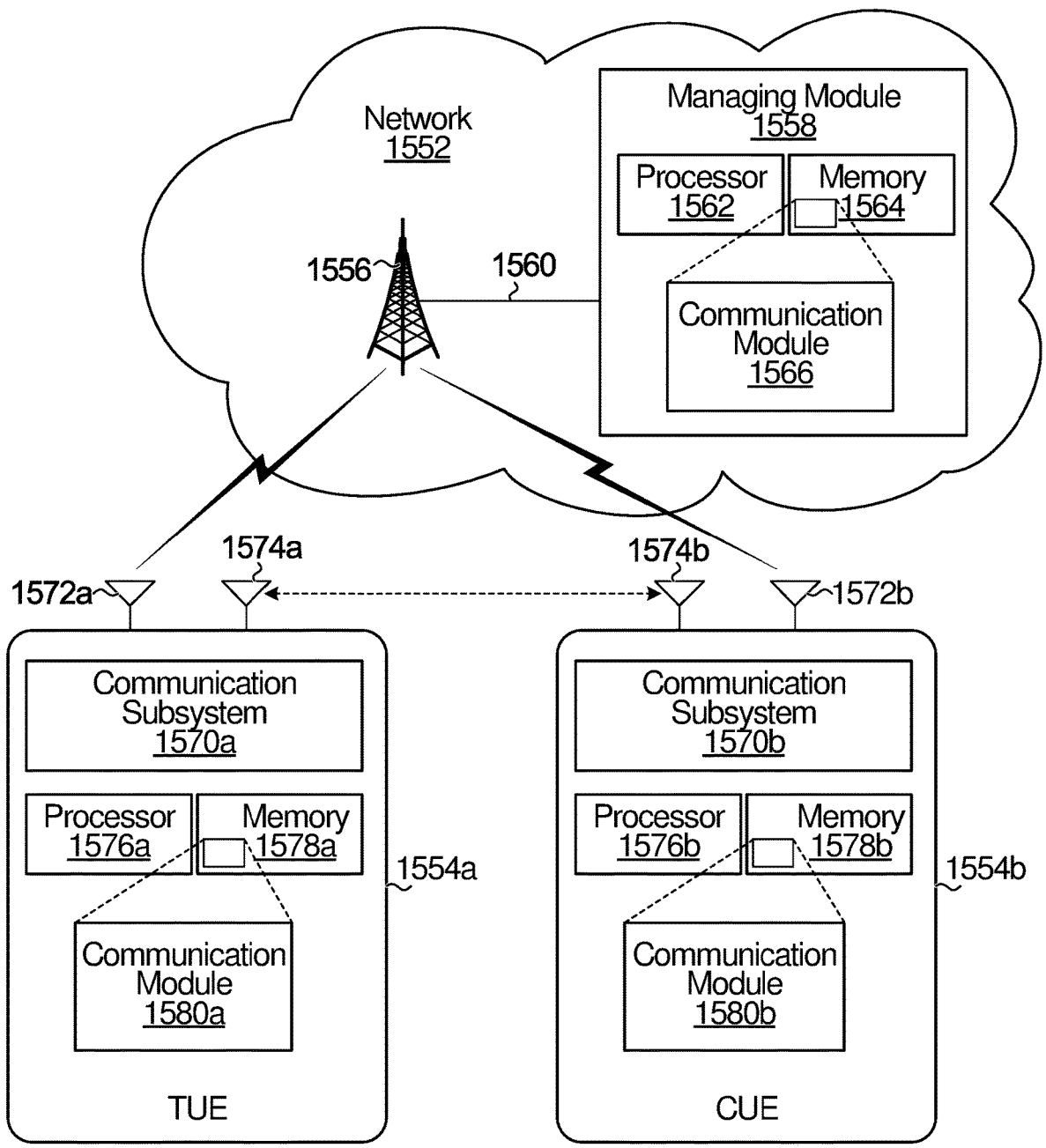
FIG. 15 is a block diagram illustrating an example of a network serving two UEs.

FIG. 15 is a block diagram illustrating an example of a network 1552 serving two UEs 1554*a* and 1554*b*, according to one embodiment. The network 1552 may be the access network 1406 from FIG. 14, and the two UEs 1554*a* and 1554*b* may be two of the four UEs 1404*a-d* in FIG. 14, or the UEs 1554*a* and 1554*b* may be UEs 1404*e* and 1404*f* in FIG. 14. However, more generally this need not be the case, which is why different reference numerals are used in FIG. 15.

The network 1552 includes a BS 1556 and a managing module 1558. The managing module 1558 instructs the BS 1556 to perform actions. The managing module 1558 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572a and 1574a. A single antenna may be used. Alternatively, there may be several antennas, but not separated into antennas dedicated only to SL communication and antennas dedicated only to communicating with the BS 1556.

SL communications could be over Wi-Fi, in which case the antenna 1574a may be a Wi-Fi antenna. Alternatively, the SL communications could be over Bluetooth™, in which case the antenna 1574a may be a Bluetooth™ antenna. SL communications could also or instead be over licensed or unlicensed spectrum.

The UE 1554b includes the same components described above with respect to the UE 1554a. That is, UE 1554b includes communication subsystem 1570b, antennas 1572b and 1574b, processor 1576b, memory 1578b, and communication module 1580b.

The UE 1554a is designated as a target UE (TUE) and will therefore be called TUE 1554a. The UE 1554b is a cooperating UE and will therefore be called CUE 254b. The CUE 1554b may be able to assist with wireless communications between the BS 1556 and TUE 1554a if a UE group were to be established that included TUE 1554a and CUE 1554b. Other communication scenarios are also contemplated, in a V2X application, for example.

UE 1554a may be specifically chosen as the target UE by the network 1552, such as by the BS 1556 or the managing module 1558. Alternatively, the UE 1554a may itself determine that it is to be a target UE and inform the network 1552 by sending a message to the BS 1556. Example reasons why UE 1554a may choose or be selected by the network 1552 to be a target UE include: low wireless channel quality between the UE 1554a and the BS 1556, many packets to be communicated between the BS 1556 and the UE 1554a, and/or the presence of a cooperating UE that is a good candidate for helping with communications between the BS 1556 and the UE 1554a.

UE 1554a need not always stay a target UE. For example, UE 1554a may lose its status as a target UE once there is no longer a need or desire for assistance with wireless communications between UE 1554a and the BS 1556. UE 1554a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples above, the UE 1554a acts only as a target UE and is referred to as TUE 1554a, and the UE 1554b is a cooperating UE to the TUE 1554a and is referred to as CUE 1554b only for the purpose of illustration.

FIGS. 14 and 15 illustrate systems in which embodiments could be implemented. In some embodiments, a UE includes a processor, such as 1576a, 1576b in FIG. 15, and a non-transitory computer readable storage medium, such as 1578a, 1578b in FIG. 15, storing programming for execution by the processor. A non-transitory computer readable storage medium could also or instead be provided separately, as a computer program product.

In such embodiments, programming could include instructions to: receive, by the UE, a message indicating a sidelink (SL) communication resource configuration to be used by the UE for communicating SL control information and SL data between the UE and another UE; transmit, by the UE, SL control information according to the SL communication resource configuration; and transmit, by the UE, SL data according to the SL communication resource configuration, wherein the SL control information and the SL data are transmitted by the UE without the UE receiving, in a downlink control information (DCI), a grant of communication resources.

The instructions to transmit the SL control information could include instructions to transmit, by the UE, the SL control information, such as a scheduling assignment (SA), to the other UE using a communication resource defined in the SL communication resource configuration, the SL control information indicating communication resources used for transmitting the SL data.

The SL communication resource configuration could include a transmission pattern that defines a pattern for transmitting the SL data or the SL control information. In some embodiments, the pattern is a pattern of time resources, frequency resources, or time and frequency resources for transmitting the SL data or the SL control information.

The transmission pattern could define an initial transmission of a data block and a repetition of the data block, and could also define time resources used for the initial transmission of the data block and the repetition of the data block.

An SL communication resource configuration could include a starting time of the transmission pattern, and the transmission pattern could further define a time gap from the initial transmission of the data block to the repetition of the data block.

Instructions to transmit the SL control information could include instructions to transmit one instance of the SL control information for both the initial transmission of the data block and the repetition of the data block.

In some embodiments, the instructions to transmit the SL control information include instructions to transmit a separate instance of the SL control information for each of the initial transmission of the data block and the repetition of the data block.

The programming could also include instructions to listen for SL transmissions by other UEs during segments of the transmission pattern other than the SL transmissions.

One or more other UEs may use a different transmission pattern.

The SL communication resource configuration could define a transmission pattern pool that includes multiple transmission patterns, as disclosed herein. The programming could then include instructions to identify the transmission pattern among the transmission patterns of the transmission pattern pool.

For example, the UE could belong to a UE group and the transmission pattern pool could include a transmission pattern pool configured for the UE group. The instructions to identify the transmission pattern could then include instructions to identify the transmission pattern based on a UE index of the UE. The programming could also include instructions to receive additional signaling assigning the UE index to the UE. The additional signaling could be downlink control information (DCI) signaling, for example.

The instructions to identify the transmission pattern could include instructions to select the transmission pattern. The selection of the transmission pattern is random in some embodiments, but other selection options are possible.

The SL communication resource configuration could define a transmission pattern for transmitting the SL control information. The transmission pattern for transmitting the SL control information could be the same or different from the transmission pattern for transmitting the SL data.

The SL communication resource configuration could define communication resources used for transmitting the SL control information or the SL data communication, and the communication resources could include at least one of time-domain resources, frequency-domain resources and code-domain resources.

The received message indicating the SL communication resource configuration could be a radio resource control (RRC) message as disclosed by way of example herein, or another type of message such as a Medium Access Control layer Control Element (MAC CE) message.

Examples of an SL communication resource configuration include any one or more of: a starting time of a transmission pattern, a periodicity of the transmission pattern, an offset of the starting time, a bitmap representation of the transmission pattern, a length of the transmission pattern, frequency sub-channels of the transmission pattern, a number of repetitions, redundancy version sequence for the repetitions, and a reference signal configuration.

In some embodiments, network equipment such as a base station includes a processor, such as 1562 in FIG. 15, and a non-transitory computer readable storage medium, such as 1564 in FIG. 15, storing programming for execution by the processor. A non-transitory computer readable storage medium could also or instead be provided separately, as a computer program product.

In such embodiments, programming could include instructions to optionally receive, by the base station, a request from a UE for SL communication resources.

The programming also or instead includes instructions to transmit, by the base station to a first UE, a message indicating an SL communication resource configuration to be used by the first UE for communicating SL control information and SL data between the UE and a second UE. The SL control information and the SL data are transmitted by the first UE without the base station transmitting, in a DCI, a grant of communication resources to the first UE. The SL data could be communicated between the first UE and multiple other UEs, not only the second UE.

In some embodiments, the configuration includes one or more transmission patterns. For example, the SL communication resource configuration could define a transmission pattern pool that includes multiple transmission patterns. The transmission patterns could define how communication resources are to be used for SL control, SL data transmissions, or both. In some embodiments, a transmission pattern defines a pattern of time resources, frequency resources, or time and frequency resources for transmitting the SL data or the SL control data.

The SL communication resource configuration could define a transmission pattern for transmitting SL control information. The transmission pattern and/or pool for transmitting the SL control information could be the same as or different from a transmission pattern and/or pool for transmitting the SL data communication.

In some embodiments, the SL communication resource configuration defines a repetition pattern.

As noted above, in some embodiments the SL communication resource configuration includes a transmission pattern that defines a pattern for transmitting the SL data. The transmission pattern could define an initial transmission of a data block and a repetition of the data block. The transmission pattern could further define time resources used for the initial transmission of the data block and the repetition of the data block. The SL communication resource configuration could further include a starting time of the transmission pattern, and the transmission pattern further defines a time gap from the initial transmission of the data block to the repetition of the data block.

In embodiments that involve a transmission pattern pool that includes multiple transmission patterns, the first UE selects or otherwise identifies the transmission pattern for transmitting SL data, from the transmission pattern pool. For example, the first UE could belong to a UE group and the transmission pattern pool could include a transmission pattern pool configured for the UE group. In these embodiments, the first UE could identify a transmission pattern from among the transmission patterns of the transmission pattern pool for the UE group. Identifying the transmission pattern could include identifying the transmission pattern based on a UE index of the first UE, and this could involve receiving additional signaling assigning the UE index to the first UE for example. In some embodiments, programming includes instructions to transmit, by the base station to the first UE, additional signaling such as DCI signaling. DCI activation as shown at 805 in FIG. 8 and DCI scheduling as shown at 906 in FIG. 9 are examples.

Other embodiments are also possible and could include additional features, fewer features, and/or different features.

For example, in some embodiments programming includes instructions to transmit, by the base station, messages to multiple UEs that use different transmission patterns.

In further embodiments, the communication resources defined by the SL communication resource configuration for transmitting the SL control information or the SL data include at least one of time-domain resources, frequency-domain resources and code-domain resources.

The present disclosure also provides various options for performing operations. For example, the programming includes instructions to transmit the message indicating the SL communication resource configuration, as an RRC message or a MAC CE message in some embodiments.

Examples of an SL communication resource configuration are provided elsewhere herein, and could include any one or more of: a starting time of a transmission pattern, a periodicity of the transmission pattern, an offset of the starting time, a bitmap representation of the transmission pattern, a length of the transmission pattern, frequency sub-channels of the transmission pattern, a number of repetitions, redundancy version sequence for the repetitions, and a reference signal configuration.

Embodiments disclosed herein could be useful in mitigating effects of the SL half duplex constraint. Embodiments could also improve the latency and reliability of SL transmissions using a UE specific transmission pattern, and a distributed transmission mode that can be designed to enable all UEs in a cooperation group to communicate with each other even if some transmissions are affected by collisions or the half duplex constraint, for example.

The grant-free transmission modes described herein may be used in NR other than in SL and V2X communication. For example, the grant-free transmission modes may be applicable in unlicensed transmission.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

It should also be appreciated that features disclosed herein could be applied to components other than those specifically referenced by way of example, such as V2X infrastructure components including RSUs (i.e., not just eNBs and UEs). A roadside unit (RSU) is a stationary transportation infrastructure entity (for example, an entity which can transmit speed notifications) supporting V2X applications that can exchange messages with other entities supporting V2X applications. An RSU is a logical entity which in addition to supporting V2X applications can also provide the functionalities of a network entity (for example, eNB, gNB, base station), in which case it may be referred to as an e/gNB-type RSU, or a UE, in which case it may be referred to as a UE-type RSU. Network features therefore may apply to e/gNB-type RSUs and UE features may apply to UE-type RSUs.

Various embodiments are disclosed herein. The following examples are illustrative of embodiments consistent with the present disclosure.

According to an example 1, a method performed by a UE comprises: receiving, by the UE, a message indicating an SL communication resource configuration to be used by the UE for SL control information and SL data communications between the UE and another UE; transmitting, by the UE, SL control information according to the SL communication resource configuration; and transmitting, by the UE, an SL data communication according to the SL communication resource configuration, wherein the SL control information and the SL data communication are transmitted by the UE without receiving, in a DCI, a grant of communication resources.

An example 2 relates to the method of example 1, wherein transmitting the SL control information comprises transmitting, by the UE, an SA to the other UE using a communication resource defined in the SL communication resource configuration, the SA indicating communication resources used for transmitting the SL data communication.

An example 3 relates to the method of example 1 or example 2, wherein the SL communication resource configuration comprises a transmission pattern that defines a pattern for transmitting the SL data communication.

An example 4 relates to the method of example 3, wherein the transmission pattern defines an initial transmission of a data block and a repetition of the data block.

An example 5 relates to the method of example 4, wherein the transmission pattern further defines time resources used for the initial transmission of the data block and the repetition of the data block.

An example 6 relates to the method of example 5, wherein the SL communication resource configuration further comprises a starting time of the transmission pattern, and the transmission pattern further defines a time gap from the initial transmission of the data block to the repetition of the data block.

An example 7 relates to the method of example 4, wherein transmitting the SL control information comprises transmitting one instance of the SL control information for both the initial transmission of the data block and the repetition of the data block.

An example 8 relates to the method of example 4, wherein transmitting the SL control information comprises transmitting a separate instance of the SL control information for each of the initial transmission of the data block and the repetition of the data block.

An example 9 relates to the method of any one of examples 3 to 8, further comprising: listening for SL transmissions by other UEs during segments of the transmission pattern other than the SL transmissions.

An example 10 relates to the method of any one of examples 3 to 9, wherein the other UE uses a different transmission pattern.

An example 11 relates to the method of any one of examples 3 to 10, wherein the SL communication resource configuration defines a transmission pattern pool comprising a plurality of transmission patterns; and wherein the method further comprises identifying the transmission pattern among the plurality of transmission patterns of the transmission pattern pool.

An example 12 relates to the method of 11, wherein the UE belongs to a UE group and wherein the transmission pattern pool comprises a transmission pattern pool configured for the UE group.

An example 13 relates to the method of example 11 or example 12, wherein identifying the transmission pattern comprises identifying the transmission pattern based on a UE index of the UE.

An example 14 relates to the method of example 13, further comprising: receiving additional signaling assigning the UE index to the UE.

An example 15 relates to the method of example 14, wherein the additional signaling comprises DCI signaling.

An example 16 relates to the method of any one of examples 11 to 15, wherein identifying the transmission pattern comprises selecting the transmission pattern.

An example 17 relates to the method of example 16, wherein selecting the transmission pattern is random.

An example 18 relates to the method of any one of examples 3 to 16, wherein the SL communication resource configuration further defines a transmission pattern for transmitting the SL control information.

An example 19 relates to the method of example 18, wherein the transmission pattern for transmitting the SL control information is the same as the transmission pattern for transmitting the SL data communication.

An example 20 relates to the method of example 18, wherein the transmission pattern for transmitting the SL control information is different from the transmission pattern for transmitting the SL data communication.

An example 21 relates to the method of any one of examples 1 to 20, wherein the SL communication resource configuration defines communication resources used for transmitting the SL control information or the SL data communication, wherein the communication resources comprise at least one of time-domain resources, frequency-domain resources and code-domain resources.

An example 22 relates to the method of any one of examples 1 to 21, wherein the received message indicating the SL communication resource configuration is an RRC message or a MAC CE message.

According to an example 23, a UE comprises: a processor; and a non-transitory computer readable storage medium storing programming for execution by the processor, the programming including instructions to: receive, by the UE, a message indicating a sidelink (SL) communication resource configuration to be used by the UE for SL control information and SL data communications between the UE and another UE; transmit, by the UE, SL control information according to the SL communication resource configuration; and transmit, by the UE, an SL data communication according to the SL communication resource configuration, wherein the SL control information and the SL data communication are transmitted by the UE without receiving, in a DCI, a grant of communication resources.

An example 24 relates to the UE of example 23, wherein the instructions to transmit the SL control information comprise instructions to transmit, by the UE, a scheduling assignment (SA) to the other UE using a communication resource defined in the SL communication resource configuration, the SA indicating communication resources used for transmitting the SL data communication.

An example 25 relates to the UE of example 23 or example 24, wherein the SL communication resource configuration comprises a transmission pattern that defines a pattern for transmitting the SL data communication.

An example 26 relates to the UE of example 25, wherein the transmission pattern defines an initial transmission of a data block and a repetition of the data block.

An example 27 relates to the UE of example 26, wherein the transmission pattern further defines time resources used for the initial transmission of the data block and the repetition of the data block.

An example 28 relates to the UE of example 27, wherein the SL communication resource configuration further comprises a starting time of the transmission pattern, and the transmission pattern further defines a time gap from the initial transmission of the data block to the repetition of the data block.

An example 29 relates to the UE of example 26, wherein the instructions to transmit the SL control information comprise instructions to transmit one instance of the SL control information for both the initial transmission of the data block and the repetition of the data block.

An example 30 relates to the UE of example 26, wherein the instructions to transmit the SL control information comprise instructions to transmit a separate instance of the SL control information for each of the initial transmission of the data block and the repetition of the data block.

An example 31 relates to the UE of any one of examples 25 to 30, wherein the programming further includes instructions to: listen for SL transmissions by other UEs during segments of the transmission pattern other than the SL transmissions.

An example 32 relates to the UE of any one of examples 25 to 31, wherein the other UE uses a different transmission pattern.

An example 33 relates to the UE of any one of examples 25 to 32, wherein the SL communication resource configuration defines a transmission pattern pool comprising a plurality of transmission patterns; and wherein the programming further includes instructions to identify the transmission pattern among the plurality of transmission patterns of the transmission pattern pool.

An example 34 relates to the UE of example 33, wherein the UE belongs to a UE group and wherein the transmission pattern pool comprises a transmission pattern pool configured for the UE group.

An example 35 relates to the UE of example 33 or example 34, wherein the instructions to identify the transmission pattern comprise instructions to identify the transmission pattern based on a UE index of the UE.

An example 36 relates to the UE of example 35, wherein the programming further includes instructions to: receive additional signaling assigning the UE index to the UE.

An example 37 relates to the UE of example 36, wherein the additional signaling comprises DCI signaling.

An example 38 relates to the UE of any one of examples 33 to 37, wherein the instructions to identify the transmission pattern comprise instructions to select the transmission pattern.

An example 39 relates to the UE of example 38, wherein the selection of the transmission pattern is random.

An example 40 relates to the UE of any one of examples 25 to 38, wherein the SL communication resource configuration further defines a transmission pattern for transmitting the SL control information.

An example 41 relates to the UE of example 40, wherein the transmission pattern for transmitting the SL control information is the same as the transmission pattern for transmitting the SL data communication.

An example 42 relates to the UE of example 40, wherein the transmission pattern for transmitting the SL control information is different from the transmission pattern for transmitting the SL data communication.

An example 43 relates to the UE of any one of examples 23 to 42, wherein the SL communication resource configuration defines communication resources used for transmitting the SL control information or the SL data communication, wherein the communication resources comprise at least one of time-domain resources, frequency-domain resources and code-domain resources.

An example 44 relates to the UE of any one of examples 23 to 43, wherein the received message indicating the SL communication resource configuration is an RRC message or a MAC CE message.

According to an example 45, a computer program product comprises a non-transitory computer readable storage medium storing programming, the programming including instructions to: receive, by a UE, a message indicating an SL communication resource configuration to be used by the UE for SL control information and SL data communications between the UE and another UE; transmit, by the UE, SL control information according to the SL communication resource configuration; and transmit, by the UE, an SL data communication according to the SL communication resource configuration, wherein the SL control information and the SL data communication are transmitted by the UE without receiving, in a DCI, a grant of communication resources.

An example 46 relates to the computer program product of example 45, wherein the instructions to transmit the SL control information comprise instructions to transmit, by the UE, a scheduling assignment (SA) to the other UE using a communication resource defined in the SL communication resource configuration, the SA indicating communication resources used for transmitting the SL data communication.

An example 47 relates to the computer program product of example 45 or example 46, wherein the SL communication resource configuration comprises a transmission pattern that defines a pattern for transmitting the SL data communication.

An example 48 relates to the computer program product of example 47, wherein the transmission pattern defines an initial transmission of a data block and a repetition of the data block.

An example 49 relates to the computer program product of example 48, wherein the transmission pattern further defines time resources used for the initial transmission of the data block and the repetition of the data block.

An example 50 relates to the computer program product of example 49, wherein the SL communication resource configuration further comprises a starting time of the transmission pattern, and the transmission pattern further defines a time gap from the initial transmission of the data block to the repetition of the data block.

An example 51 relates to the computer program product of example 48, wherein the instructions to transmit the SL control information comprise instructions to transmit one instance of the SL control information for both the initial transmission of the data block and the repetition of the data block.

An example 52 relates to the computer program product of example 48, wherein the instructions to transmit the SL control information comprise instructions to transmit a separate instance of the SL control information for each of the initial transmission of the data block and the repetition of the data block.

An example 53 relates to the computer program product of any one of examples 47 to 52, wherein the programming further includes instructions to: listen for SL transmissions by other UEs during segments of the transmission pattern other than the SL transmissions.

An example 54 relates to the computer program product of any one of examples 47 to 53, wherein the other UE uses a different transmission pattern.

An example 55 relates to the computer program product of any one of examples 47 to 54, wherein the SL communication resource configuration defines a transmission pattern pool comprising a plurality of transmission patterns; and wherein the programming further includes instructions to identify the transmission pattern among the plurality of transmission patterns of the transmission pattern pool.

An example 56 relates to the computer program product of example 55, wherein the UE belongs to a UE group and wherein the transmission pattern pool comprises a transmission pattern pool configured for the UE group.

An example 57 relates to the computer program product of example 55 or example 56, wherein the instructions to identify the transmission pattern comprise instructions to identify the transmission pattern based on a UE index of the UE.

An example 58 relates to the computer program product of example 57, wherein the programming further includes instructions to: receive additional signaling assigning the UE index to the UE.

An example 59 relates to the computer program product of example 58, wherein the additional signaling comprises DCI signaling.

An example 60 relates to the computer program product of any one of examples 55 to 59, wherein the instructions to identify the transmission pattern comprise instructions to select the transmission pattern.

An example 61 relates to the computer program product of example 60, wherein the selection of the transmission pattern is random.

An example 62 relates to the computer program product of any one of examples 47 to 60, wherein the SL communication resource configuration further defines a transmission pattern for transmitting the SL control information.

An example 63 relates to the computer program product of example 62, wherein the transmission pattern for transmitting the SL control information is the same as the transmission pattern for transmitting the SL data communication.

An example 64 relates to the computer program product of example 62, wherein the transmission pattern for transmitting the SL control information is different from the transmission pattern for transmitting the SL data communication.

An example 65 relates to the computer program product of any one of examples 45 to 64, wherein the SL communication resource configuration defines communication resources used for transmitting the SL control information or the SL data communication, wherein the communication resources comprise at least one of time-domain resources, frequency-domain resources and code-domain resources.

An example 66 relates to the computer program product of any one of examples 45 to 65, wherein the received message indicating the SL communication resource configuration is an RRC message or a MAC CE message.

According to an example 67, an apparatus comprises: a processor; and a non-transitory computer readable storage medium storing programming for execution by the processor, the programming including instructions to perform a method according to any one of examples 1 to 22.

According to an example 68, a computer program product comprises a non-transitory computer readable storage medium storing programming, the programming including instructions to perform a method according to any one of examples 1 to 22.

What is claimed is:

1. A method performed by a user equipment (UE), the method comprising:
    receiving, by the UE, a message indicating a sidelink (SL) communication resource configuration to be used by the UE for communicating SL control information and SL data between the UE and another UE;
    transmitting, by the UE, the SL control information to the other UE using a communication resource indicated by the SL communication resource configuration; and
    transmitting, by the UE, the SL data to the other UE using the communication resource indicated by the SL communication resource configuration,
    wherein the SL communication resource configuration comprises an indication of a periodicity of the communication resource,
    wherein the SL control information and the SL data are transmitted by the UE without the UE receiving, in a downlink control information (DCI), a grant of the communication resource, and
    wherein the SL communication resource configuration indicates a number of symbols, a starting resource block (RB), and a number of RBs, for defining a part of the communication resource used for transmitting the SL control information to the other UE.

2. The method of claim 1, wherein the SL control information indicates the communication resource used for transmitting the SL data.

3. The method of claim 1, wherein the received message indicating the SL communication resource configuration is a radio resource control (RRC) message.

4. The method of claim 1, wherein the communication resource comprises a time slot and a frequency sub-channel, and wherein the SL communication resource configuration indicates the time slot and the frequency sub-channel for transmitting the SL data and the SL control information.

5. The method of claim 4, wherein the SL communication resource configuration indicates a plurality of communication resources within a time window, each of the plurality of communication resources comprising a combination of one time slot and one or more frequency sub-channels, and the periodicity is a periodicity of the plurality of communication resources.

6. The method of claim 5, wherein the SL communication resource configuration further indicates the time slot of a first communication resource in the time window.

7. The method of claim 1, wherein the SL control information further indicates a redundancy version, a transmitting UE identity (ID) and a destination UE ID of the SL data transmission.

8. A user equipment (UE) comprising:
    a processor; and
    a non-transitory computer readable storage medium storing programming for execution by the processor, the programming including instructions to:
    receive, by the UE, a message indicating a sidelink (SL) communication resource configuration to be used by the UE for communicating SL control information and SL data between the UE and another UE;
    transmit, by the UE, the SL control information to the other UE using a communication resource indicated by the SL communication resource configuration; and
    transmit, by the UE, the SL data to the other UE using the communication resource indicated by the SL communication resource configuration,
    wherein the SL communication resource configuration comprises an indication of a periodicity of the communication resource,
    wherein the SL control information and the SL data are transmitted by the UE without the UE receiving, in a downlink control information (DCI), a grant of the communication resource, and
    wherein the SL communication resource configuration indicates a number of symbols, a starting resource block (RB), and a number of RBs, for defining a part of the communication resource used for transmitting the SL control information to the other UE.

9. The UE of claim 8, wherein the SL control information indicates the communication resource used for transmitting the SL data.

10. The UE of claim 8, wherein the received message indicating the SL communication resource configuration is a radio resource control (RRC) message.

11. The UE of claim 8, wherein the communication resource comprises a time slot and a frequency sub-channel, and wherein the SL communication resource configuration indicates the time slot and the frequency sub-channel for transmitting the SL data and the SL control information.

12. The UE of claim 11, wherein the SL communication resource configuration indicates a plurality of communication resources within a time window, each of the plurality of communication resources comprising a combination of one time slot and one or more frequency sub-channels, and the periodicity is a periodicity of the plurality of communication resources.

13. The UE of claim 12, wherein the SL communication resource configuration further indicates the time slot of a first communication resource in the time window.

14. The UE of claim 8, wherein the SL control information further indicates a redundancy version, a transmitting UE identity (ID) and a destination UE ID of the SL data transmission.

15. A method performed by a base station, the method comprising:
    transmitting, by the base station, a message to a first UE, the message indicating a sidelink (SL) communication resource configuration to be used by the first UE for communicating SL control information and SL data between the first UE and a second UE,
    wherein the SL communication resource configuration indicates a communication resource to be used for communicating the SL control information and the SL data between the first UE and the second UE,
    wherein the SL communication resource configuration comprises an indication of a periodicity of the communication resource, wherein the SL control information and the SL data are transmitted by the first UE without the base station transmitting, in a downlink control information (DCI), a grant of the communication resource to the first UE, and wherein the SL communication resource configuration indicates a number of symbols, a starting resource block (RB), and a number of RBs, for defining a part of the communication resource used for transmitting the SL control information to the second UE.

16. A base station comprising:

a processor; and a non-transitory computer readable storage medium storing programming for execution by the processor, the programming including instructions to transmit a message to a first UE, the message indicating a sidelink (SL) communication resource configuration to be used by the first UE for communicating SL control information and SL data between the first UE and a second UE, wherein the SL communication resource configuration indicates a communication resource to be used for communicating the SL control information and the SL data between the first UE and the second UE, wherein the SL communication resource configuration comprises an indication of a periodicity of the communication resource, wherein the SL control information and the SL data are transmitted by the first UE without the base station transmitting, in a downlink control information (DCI), a grant of the communication resource to the first UE, and wherein the SL communication resource configuration indicates a number of symbols, a starting resource block (RB), and a number of RBs, for defining a part of the communication resource used for transmitting the SL control information to the second UE.

17. A method performed by a user equipment (UE), the method comprising:

receiving, by the UE, a message indicating a sidelink (SL) communication resource configuration to be used by the UE for communicating SL control information and SL data between the UE and another UE;

transmitting, by the UE, the SL control information to the other UE using a communication resource indicated by the SL communication resource configuration; and transmitting, by the UE, the SL data to the other UE using the communication resource indicated by the SL communication resource configuration, wherein the SL communication resource configuration comprises an indication of a periodicity of the communication resource, wherein the SL control information and the SL data are transmitted by the UE without the UE receiving, in a downlink control information (DCI), a grant of the communication resource, wherein the communication resource comprises a time slot and a frequency sub-channel, and wherein the SL communication resource configuration indicates the time slot and the frequency sub-channel for transmitting the SL data and the SL control information, wherein the SL communication resource configuration indicates a plurality of communication resources within a time window, each of the plurality of communication resources comprising a combination of one time slot and one or more frequency sub-channels, and the periodicity is a periodicity of the plurality of communication resources, and wherein transmitting the SL data to the other UE comprises transmitting the SL data in a first transmission according to a first communication resource of the plurality of communication resources and transmitting the SL data in a second transmission according to a second communication resource of the plurality of communication resources.

18. A user equipment (UE) comprising:

a processor; and a non-transitory computer readable storage medium storing programming for execution by the processor, the programming including instructions to:

receive, by the UE, a message indicating a sidelink (SL) communication resource configuration to be used by the UE for communicating SL control information and SL data between the UE and another UE;

transmit, by the UE, the SL control information to the other UE using a communication resource indicated by the SL communication resource configuration; and transmit, by the UE, the SL data to the other UE using the communication resource indicated by the SL communication resource configuration, wherein the SL communication resource configuration comprises an indication of a periodicity of the communication resource, wherein the SL control information and the SL data are transmitted by the UE without the UE receiving, in a downlink control information (DCI), a grant of the communication resource, wherein the communication resource comprises a time slot and a frequency sub-channel, and wherein the SL communication resource configuration indicates the time slot and the frequency sub-channel for transmitting the SL data and the SL control information, wherein the SL communication resource configuration indicates a plurality of communication resources within a time window, each of the plurality of communication resources comprising a combination of one time slot and one or more frequency sub-channels, and the periodicity is a periodicity of the plurality of communication resources, and wherein the instructions to transmit the SL data to the other UE comprise instructions to transmit the SL data in a first transmission according to a first communication resource of the plurality of communication resources and to transmit the SL data in a second transmission according to a second communication resource of the plurality of communication resources.

* * * * *